US008432442B2

(12) United States Patent
Nam et al.

(10) Patent No.: US 8,432,442 B2
(45) Date of Patent: Apr. 30, 2013

(54) METHOD FOR SELF LOCALIZATION USING PARALLEL PROJECTION MODEL

(75) Inventors: Yun Young Nam, Suwon-si (KR); Yun Tai Kyong, Suwon-si (KR); Shung Han Cho, Suwon-si (KR); Sang Jin Hong, Suwon-si (KR); We-Duke Cho, Seongnam-si (KR)

(73) Assignee: Yaejune International Patent Law Firm, Seoul (KR)

( * ) Notice: Subject to any disclaimer, the term of this patent is extended or adjusted under 35 U.S.C. 154(b) by 572 days.

(21) Appl. No.: 12/675,344

(22) PCT Filed: Oct. 25, 2007

(86) PCT No.: PCT/KR2007/005274
§ 371 (c)(1),
(2), (4) Date: Feb. 25, 2010

(87) PCT Pub. No.: WO2009/035183
PCT Pub. Date: Mar. 19, 2009

(65) Prior Publication Data
US 2010/0245564 A1    Sep. 30, 2010

(30) Foreign Application Priority Data
Sep. 12, 2007  (KR) .......................... 10-2007-0092775

(51) Int. Cl.
*H04N 7/18* (2006.01)
(52) U.S. Cl.
USPC ............ 348/135; 348/116; 348/129; 382/106

(58) Field of Classification Search ................. 348/116, 348/135, 129; 382/106; 396/428; 700/245; 435/286.4; 702/158
See application file for complete search history.

(56) References Cited

U.S. PATENT DOCUMENTS

| | | | | |
|---|---|---|---|---|
| 8,073,564 | B2 * | 12/2011 | Bruemmer et al. ........... | 700/245 |
| 2001/0055063 | A1 * | 12/2001 | Nagai et al. .................. | 348/116 |
| 2002/0052711 | A1 * | 5/2002 | Aoyama ....................... | 702/158 |
| 2006/0129276 | A1 * | 6/2006 | Watabe et al. ................ | 700/245 |
| 2006/0148063 | A1 * | 7/2006 | Fauzzi et al. ................ | 435/286.4 |
| 2006/0177101 | A1 * | 8/2006 | Kato et al. .................... | 382/106 |
| 2007/0183770 | A1 * | 8/2007 | Aoki et al. .................... | 396/428 |

* cited by examiner

*Primary Examiner* — Jungwon Chang
(74) *Attorney, Agent, or Firm* — Stein IP, LLC

(57) ABSTRACT

A method of recognizing a self location of an image acquisition device by acquiring an image of two or more reference objects is provided. The method of the present invention comprises setting an actual camera plane, two or more reference object planes, and two or more virtual viewable planes located between the actual camera plane and the reference object planes; projecting the reference objects to a corresponding one of the virtual viewable planes; calculating a distance between a viewing axis and the reference objects and a distance between the viewing axis and images on the actual camera plane, the images corresponding to the reference objects; and sensing the self location of the image acquisition device by using an orientation and a zoom factor of the image acquisition device and coordinates of the reference objects, wherein the zoom factor is a ratio of a length of the reference object plane and a distance between the reference object plane and the virtual viewable plane, and the actual camera plane, the virtual viewable plane, and the reference object plane are perpendicular to the viewing axis.

5 Claims, 21 Drawing Sheets

Orientation Error, $\Delta\theta=2$

Orientation Error, $\Delta\theta=4$

Orientation Error, $\Delta i = 0.03$

Orientation Error, $\Delta i = 0.005$

Measurement Error, $\Delta i = 0.01$

Measurement Error, $\Delta i = 0.05$

Measurement Eerror, $\Delta i = 0.005$

Measurement Eerror, $\Delta i = 0.01$

Sensor Position
Displacement Error

Sensor Position
Orientation Error

METHOD FOR SELF LOCALIZATION USING PARALLEL PROJECTION MODEL

This is a National Phase Application filed under 35 U.S.C. 371 as a national stage of PCT/KR2007/005274, filed on Oct. 25, 2007, an application claiming foreign priority benefits under 35 USC 119 of Korean Application No. 10-2007-0092775, filed on Sep. 12, 2007, the content of each of which is hereby incorporated by reference in its entirety.

TECHNICAL FIELD

The present invention relates self localization method and, in particular, to a method for self localization using parallel projection model for mobile sensor in navigation.

BACKGROUND ART

In general, self localization visual information is related tophotometry. The typical process of self localization involves two processes. The first process is to extract features from the image and the second process is to use these extracted information for localization. "J. Yuan. A general photogrammetric method for determining object position and orientation. pages 129-142, 1989" presents a general method for determining the three-dimensional position and orientation of an object relative to a camera based on a two-dimensional image of known feature points located on the object. "O. Leboulleux R Horaud, B. Conio and B. Lacolle. An analytic solution for the perspective 4-point problem. pages 33-44, 1989" analytically deals with the perspective n-point (PnP) problems with four correspondence of scene objects. The self localization is developed with a focus of applying the algorithm for robot navigation.

A simple method for visual localization which allows a robot to determine its absolute position with a view of single landmark in one image is presented in "http://www.tamron.com/." In this algorithm, the actual camera plane is perpendicular to the optical axis and aligned with the optical axis at a distance f called focal length.

To track the landmark model, Lucas-Kanade optical flow algorithm is applied by using gradient descent. This algorithm has feasible real-time performance in indoor environments. However, the approach has the limitation in that with the pinhole camera model only one correspondence can be established.

Another localization algorithm which is based on comparing the images taken in advance and taken during navigation is discussed in "J. Borenstein, H. Everett, L. Feng, and D. Wehe, "Mobile robot positioning: Sensors and techniques," *Journal of Robotic Systems*, vol. 14, no. 4, pp. 231-249, 1997". In this scheme, the shape and the coordinate of images are stored in memory efficient format for quick retrieval and comparison. This algorithm has restriction on the shape of landmark and is not suitable in open area.

Similar method is presented where planar landmarks are used in visual localization of a mobile robot in indoor environment, "F. Lerasle V. Ayala, J. B. Hayet and M. Devy. Visual localization of a mobile robot in indoor environment using planar landmarks. In *Proceeding of the 2000 IEEE/RSJ International Conference on Intelligent Robots and Systems*, pages 275-280, 2000". Scale Invariant Feature Transform (SIFT) developed for image feature generation in object recognition application is used for robot localization in "S. Se, D. Lowe, and J. Little. Vision-based mobile robot localization and mapping using scale-invariant features. In *Proceedings of the IEEE International Conference on Robotics and Automation (ICRA)*, pages 2051-2058, Seoul, Korea, May 2001".

The invariant characteristic of SIFT are captured by three images and stereo-matched to elect landmark that later used to compute 3-D world coordinate relative to the robot. This algorithm use three cameras requires expensive computational power.

DETAILED DESCRIPTION OF THE INVENTION

Technical Problem

FIG. 1 illustrates the problem of self localization of mobile sensor with multiple reference objects of which coordinates are known beforehand to mobile sensor. In this paper, we define the term 'mobile sensor' to describe a mobile robot with visual sensor.

We assume that mobile sensor can identify the reference objects and their coordinates are known (i.e., stored in a database). We limit our discussion to the self localization problem and the method of how to identify such objects is not considered. The mobile sensor navigates by itself and visual image is obtained periodically.

Based on the captured image data, the self localization comprises of determining both the orientation and the location of mobile sensor. We use global coordinate system of which origin is arbitrary chosen but used to represent the coordinates of the reference points and the location of mobile sensor.

The objective is to utilize the projected reference points to determine the location of the mobile sensor. In this paper, we focus on two aspects of the proposed method. The first aspect is to maintain accuracy of the self localization and the second aspect is to maintain computational efficiency.

Since our method uses captured image data by typical digital imaging device, several sources of error are possible. Since the proposed approach relies on the point that is chosen from an area of pixels which is projected image of reference object, there can be inherent error from image processing that elect one point from the area of object image.

This error can vary depending on the many factors such as distance from mobile sensor to reference objects, distance between reference objects etc. In addition, non-linearity of the lens of imaging device causes shifting of projected point when the distance to reference points are not known.

This shifting also affects the fidelity of self localization if compensation is not done. Since the mobile sensor changes its location and orientation continuously, the reference points may change accordingly. The self location method should be computationally efficient by effectively utilizing available reference points.

As we will show later in this paper, that the selection of reference points affects the self localization errors. When more than three reference points are inside viewable range of mobile sensor at the same time, mobile sensor has a freedom to choose the reference objects such a way that can minimize such error.

Therefore, multiple reference objects should be strategically distributed to harness self localization of individual mobile sensor. A computationally efficient iterative algorithm using the relationship between the location of reference points is proposed.

Technical Solution

In accordance with an aspect of the present invention, the above and other objects are accomplished by a method of recognizing a self location of an image acquisition device by acquiring an image of two or more reference objects.

The method comprising: setting an actual camera plane, two or more reference object planes, and two or more virtual viewable planes located between the actual camera plane and the reference object planes; projecting the reference objects to a corresponding one of the virtual viewable planes; calculating a distance between a viewing axis and the reference objects and a distance between the viewing axis and images on the actual camera plane, the images corresponding to the reference objects; and sensing the self location of the image acquisition device by using an orientation and a zoom factor of the image acquisition device and coordinates of the reference objects, wherein the zoom factor is a ratio of a length of the reference object plane and a distance between the reference object plane and the virtual viewable plane, and the actual camera plane, the virtual viewable plane, and the reference object plane are perpendicular to the viewing axis.

Preferably, the method further comprise compensating the self location by using a compensation table, wherein the compensating comprises: estimating the self location and the orientation by using a zoom factor corresponding to an infinite distance; calculating a distance between the reference object planes and the virtual viewable plane corresponding thereto, according to the estimated location and orientation; and recalculating the location and the orientation by using the zoom factors using the distance, selected from the compensation table.

In accordance with another aspect of the present invention, the above and other objects are accomplished by a method of recognizing a self location of an image acquisition device by acquiring an image of three or more reference objects.

The method comprising: setting an actual camera plane, three or more reference object planes, and three or more virtual viewable planes located between the actual camera plane and the reference object planes; projecting the reference objects to a corresponding one of the virtual viewable planes;

calculating a distance between a viewing axis of the image acquisition device and the reference objects and a distance between the viewing axis and images on the actual camera plane, the images corresponding to the reference objects; calculating an orientation of the image acquisition device by selecting an initial orientation by using two pairs of reference points to minimize an error distance and repeatedly computing the orientation of the image acquisition device by using the initial orientation and the error distance; and sensing the self location by using the orientation, a zoom factor, and coordinates of the reference objects, wherein the zoom factor is a ratio of a length of the reference object plane and a distance between the reference object plane and the virtual viewable plane, and the actual camera plane, the virtual viewable plane, and the reference object plane are perpendicular to the viewing axis.

Preferably, the calculating an orientation of the image acquisition device comprises: selecting an orientation allowing the error distance to be minimized, as the initial orientation by using the two pairs of the reference points; selecting a smaller one between an error distance corresponding to the initial orientation and an error distance corresponding to an orientation greater than the initial orientation by 90 degrees, as an initial error distance; calculating an approximate orientation by deducting a minute orientation from the initial orientation, calculating an approximate error distance corresponding to the approximate orientation, and calculating a slope at a location corresponding to the initial orientation by using a ratio of a difference between the initial error distance and the approximate error distance corresponding to the approximate orientation and the minute orientation; setting a direction of iteration to be negative and setting the approximate error distance to be a present error distance when the slope is positive and setting the direction of iteration to be positive when the slope is not positive; setting an absolute value of the slope as an initial slope, setting a ratio of the present error distance and a present slope as a next minute orientation, setting a value obtained by adding a value obtained by multiplying the direction of iteration by the minute orientation to a present orientation as a next orientation, and setting an error distance corresponding to the present orientation as a new present error distance; reiterating the setting operations until the minute orientation becomes a predetermined threshold and repeatedly computing a value obtained by multiplying a ratio of the present error distance and a value obtained by adding the present error distance to a previous error distance by a present minute orientation as the next orientation; and determining the previous orientation repeatedly computed to be the orientation of the image acquisition when the minute orientation is the predetermined threshold or less.

Preferably, the method further comprises compensating the location by using a compensation table, wherein the compensating comprises: estimating the location and the orientation by using a zoom factor corresponding to an infinite distance; calculating a distance between the reference object planes and the virtual viewable plane corresponding thereto, according to the estimated location and orientation; and recalculating the location and orientation by using the zoom factors using the distance, the zoom factors selected from the compensating table.

ADVANTAGEOUS EFFECTS

As described above, according to an embodiment of the present invention, there is provided a self localization method capable of self localizing using single images acquired by an image acquisition device, thereby simplifying a configuration for self localization and reducing the cost thereof.

According to an embodiment of the present invention, there is provided a self localization method capable of calculating an orientation of an image acquisition device by reiterating simple computations, thereby greatly reducing computational complexity for finding the orientation.

According to an embodiment of the present invention, there is provided a self localization method capable of compensating a distortion caused by the nonlinearity of an image acquisition device, thereby more accurately recognizing a self location.

BEST MODE FOR CARRYING OUT THE INVENTION

Figure 1:
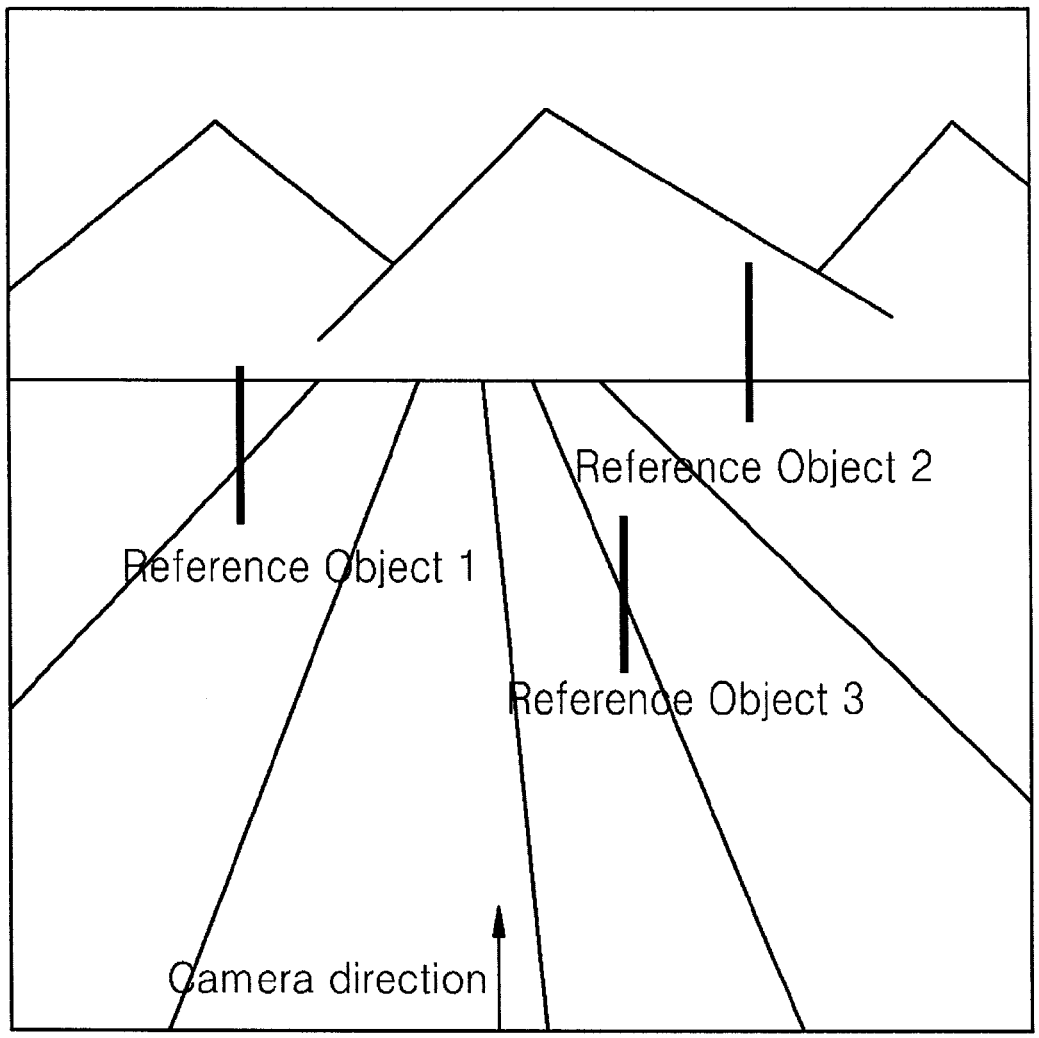
FIG. 1 is an Illustration of the self localization problem where several reference objects are shown on image data captured by mobile sensor.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

1. INTRODUCTION

This invention relates to a novel self localization method using parallel projection model for mobile sensor in navigation applications. The algorithm estimates the coordinate and the orientation of mobile sensor using projected references on visual image. The proposed method considers non-linearity of the lens view distortion and compensates the distortion using a calibration table. The method determines the coordinates and orientations with iterative process, which is very accurate with low computational demand. We identify various sources of error on the coordinate and orientation estimations, and present both static sensitivity analysis of the algorithm and dynamic behavior of the mobile sensor. The algorithm can be utilized in mobile robot navigation as well as positioning application where accurate self localization is necessary.

Self localization is a key operation in mobile robot (or mobile sensor) navigation applications. Generally, two approaches are possible. The first approach is maintaining the movement history internally by the mobile sensor. However, the error can be accumulated during the navigation and its position and orientation cannot be tracked accurately.

The other approach is to use external information periodically. Range finder and sonar are often used for the localization, but they are not suitable in highly-dynamic environments where the radar or sonar beams can be blocked frequently by people and sensors can be easily confused. They are also not applicable to localization in large area because of their limited range.

Also passive sensor such as sonar requires beacon type landmarks, which requires modification of environment and is not practical especially in outdoor environment. Moreover, interference between several mobile sensors causes inability to properly localize their locations.

However, Visual information based localization approach does not require modification of environment. The visual information based localization can be more effective and reliable in dynamic environment. The visual based localization can be based on either artificial landmark or natural landmark. The coordinate of robot can be only based on local and topological information or can be respect to a global reference system. In the latter case the global coordinate of landmarks or reference objects have been learned by mobile robot when navigating.

In this invention, we propose a self localization method using a single visual image taken from traditional digital imaging device. We assumed that landmarks or reference objects can be reliably identified and extracted through traditional image processing. Several reference points can be derived from the landmarks where parallel projection model translates these points to form a set of known geometrical relationships. Using the relationships, the coordinate and orientation of the mobile sensor can be efficiently determined. The parallel projection model simplifies the computational complexity and compensates the non-linearity due to optical lens distortion. The proposed method iteratively determines the coordinates and the orientations. Our method can be used in large area with artificial or natural references as long as their coordinates are known and their identities can be reliably identified.

2. CHARACTERIZATION OF VIEWABLE IMAGES

A. Basic Concept of Parallel Projection Model

Figure 2:
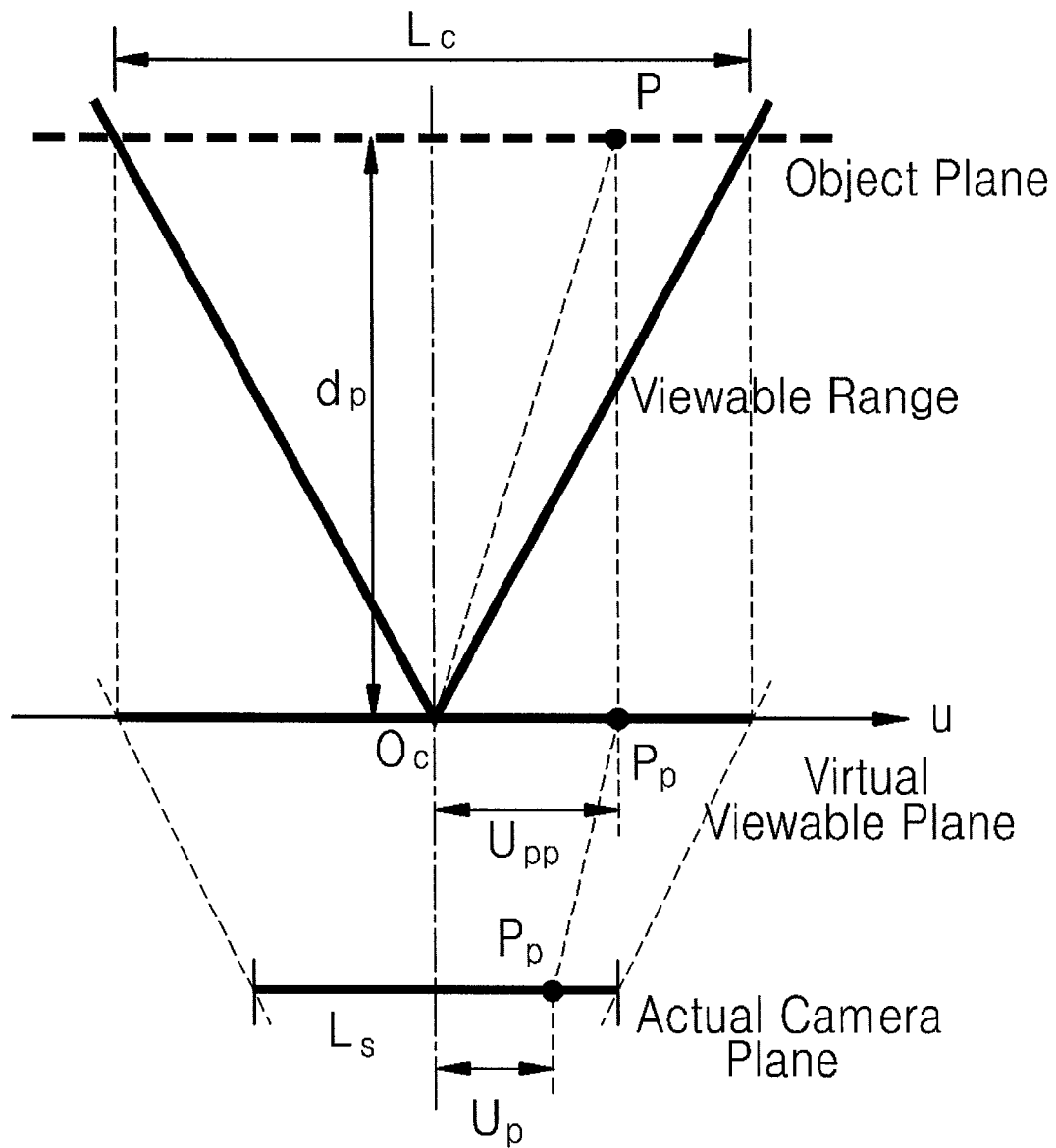
FIG. 2 is an Illustration of the parallel projection model and the relationship with the actual image projected on visual sensor (Camera).

In this section, we introduce parallel projection model. In order to simplify the process of projected image on camera device, we define three planes; the object plane, the virtual viewable plane and the actual camera plane as shown in FIG. 2.

An object P which is in the viewable area of mobile sensor, is considered to be on object plane. As oppose to the traditional model of camera, in parallel projection model, the object P is projected in parallel onto virtual viewable plane to and the projected point is denoted as $p_p$. The Virtual viewable plane is parallel to the object plane with distance $d_p$. $L_c$ denotes the length of object plane, which is the length of viewable area at distance $d_p$. $L_s$ denotes the length of actual camera plane on which the measurement of projected image is done. The positions of projected object on virtual viewable plane and actual camera plane is denoted as $U_{pp}$ and $u_p$, respectively.

In the parallel projection model, a real object located on object plane is projected to actual camera plane through virtual viewable plane. Hence, as formulated in Equation (1), $u_{pp}$ is expressed as $L_c$, $L_s$ and $u_p$ using the proportionality of the length of virtual viewable plane and actual camera plane.

$$u_{pp} = u_p \left( \frac{L_c}{L_s} \right) \quad (1)$$

The position of real object can be obtained from $u_{pp}$ and $d_p$, once the ratio of $L_c$ and $d_p$ is known. This ratio is defined to be zoom factor, z, which is the property of image device.

$$z = \frac{d_p}{L_c} \quad (2)$$

Figure 3:
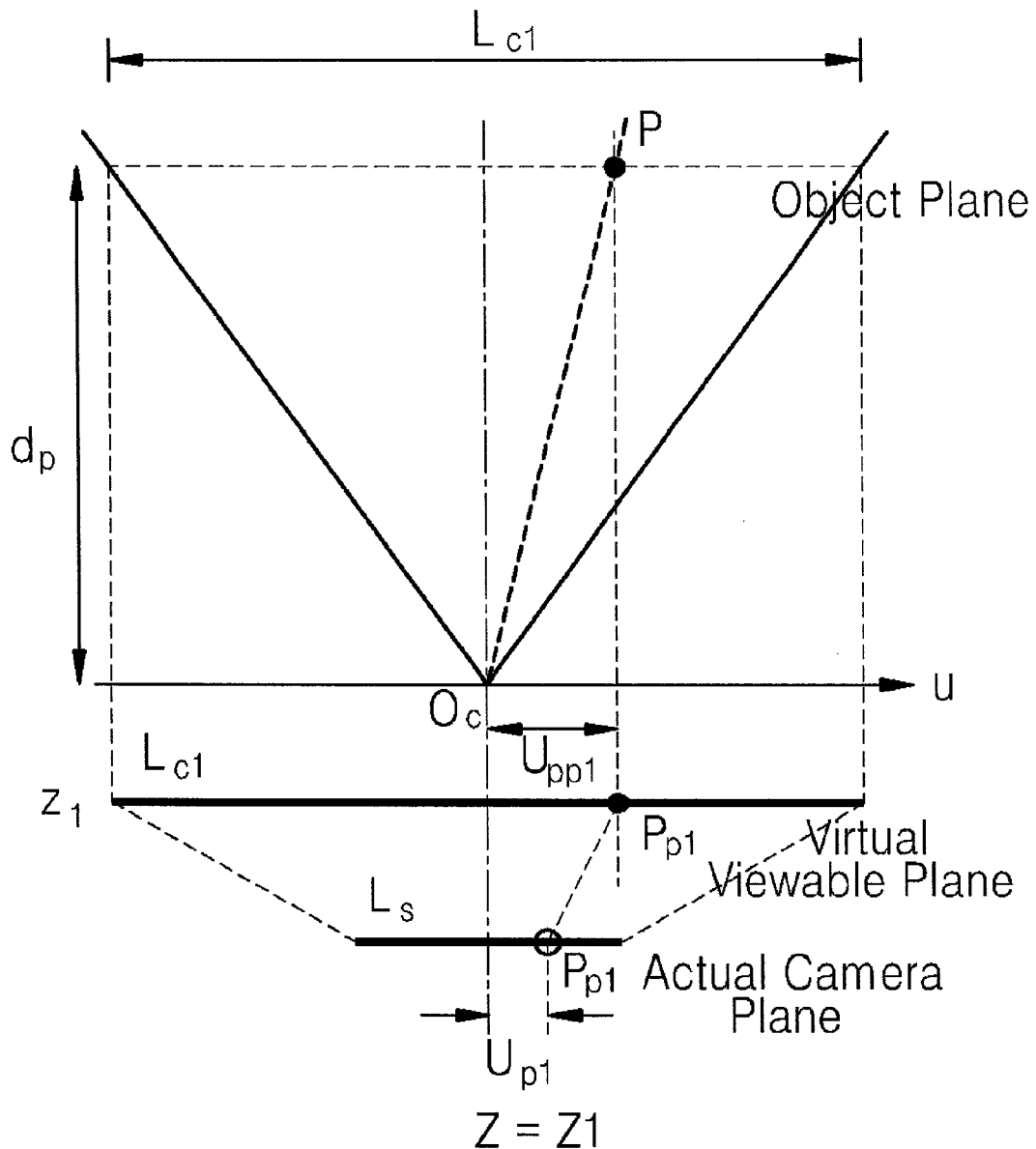
FIG. 3 and FIG. 4 are Illustration of zooming effects on the Virtual Viewable Plane.
Figure 4:
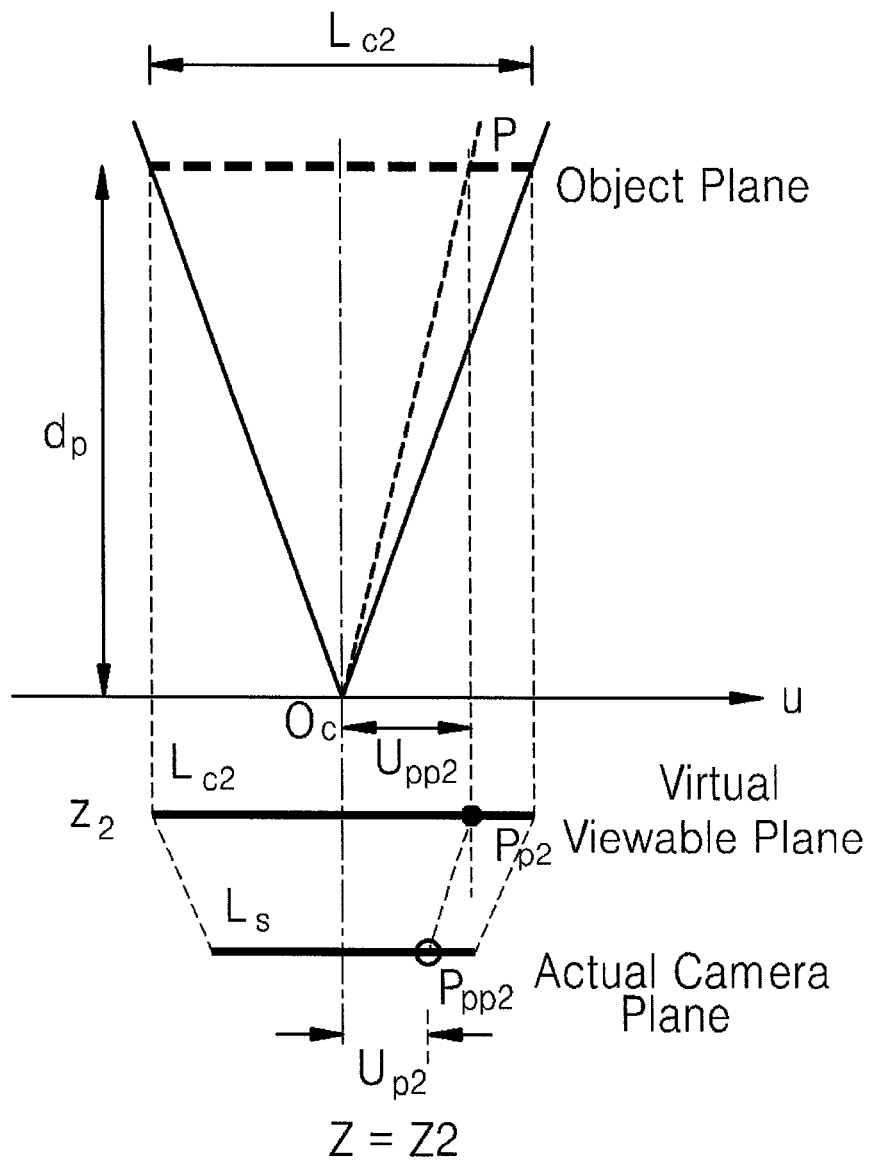

FIG. 3 and FIG. 4 show the effect of different zoom factors. Although the position of $u_{p1}$ and $U_{p2}$ on actual camera Plane are different with different zoom factors, $z_1$ and $z_2$, the position of $u_{pp1}$ and $u_{pp2}$ on virtual viewable plane remain same. From Equation (1), $u_{pp1}$ is expressed as $u_{p1}(Lc1/Ls)$ and $u_{pp2}$ is $u_{p2}(Lc2/Ls)$.

Since the position $u_{pp1}$ and $u_{pp2}$ are same, $u_{p1}$ can be expressed as $u_{p2}(Lc2/Lc1)$. Also, since $z_1=dp/Lc1$ and $z_2=dp/Lc2$ from Equation (2), the position of the projected object on actual camera plane with one zoom factor can be expressed with the position with the other zoom factor.

$$u_{p1} = u_{p2} \frac{z_2}{z_1} \quad (3)$$

Figure 5:
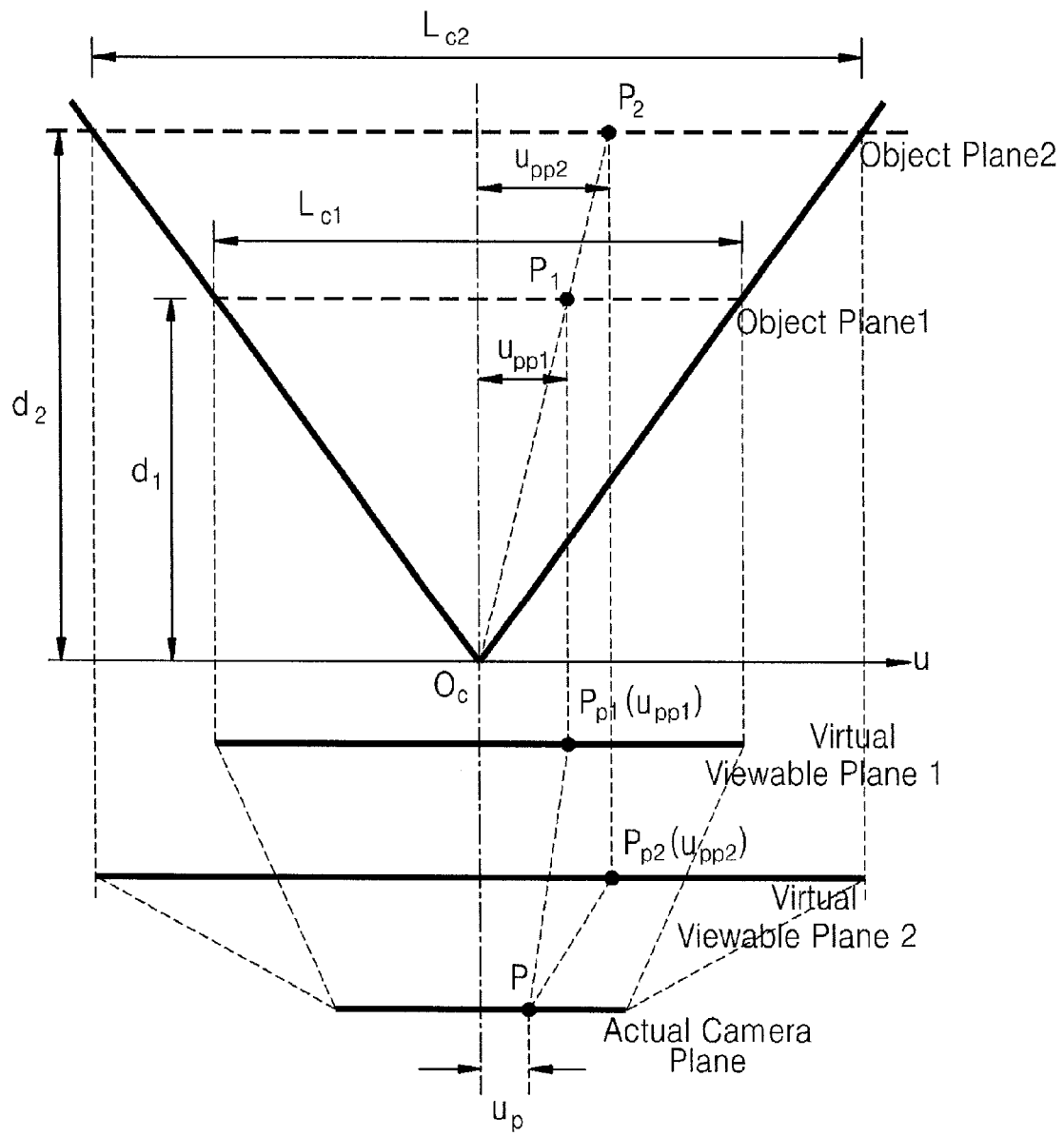
FIG. 5 is an Illustration of zooming model in the Parallel Projection Model.

FIG. 5 illustrates the case where two objects of $P_1$ and $P_2$ on different object plane, that is, at different distance, appear as a single point on actual camera plane. The objects are considered to be projected to $u_{pp1}$ and $u_{pp2}$ on two different virtual viewable planes, but meet at a same point on actual camera plane. From equation (1), $U_{pp1}$ is expressed as up(Lc1/Ls) and $u_{pp2}$ as up(Lc2/Ls). For this case, the following condition $$\frac{u_{pp1}}{d_1} = \frac{u_{pp2}}{d_2} \quad (4)$$

should be met. Here, we used the definition of zoom factor, $Lc1=d_1/z$ and $Lc2=d_2/z$ from Equation (2).

B. Relationship of Reference Points on Different Planes

Figure 6:
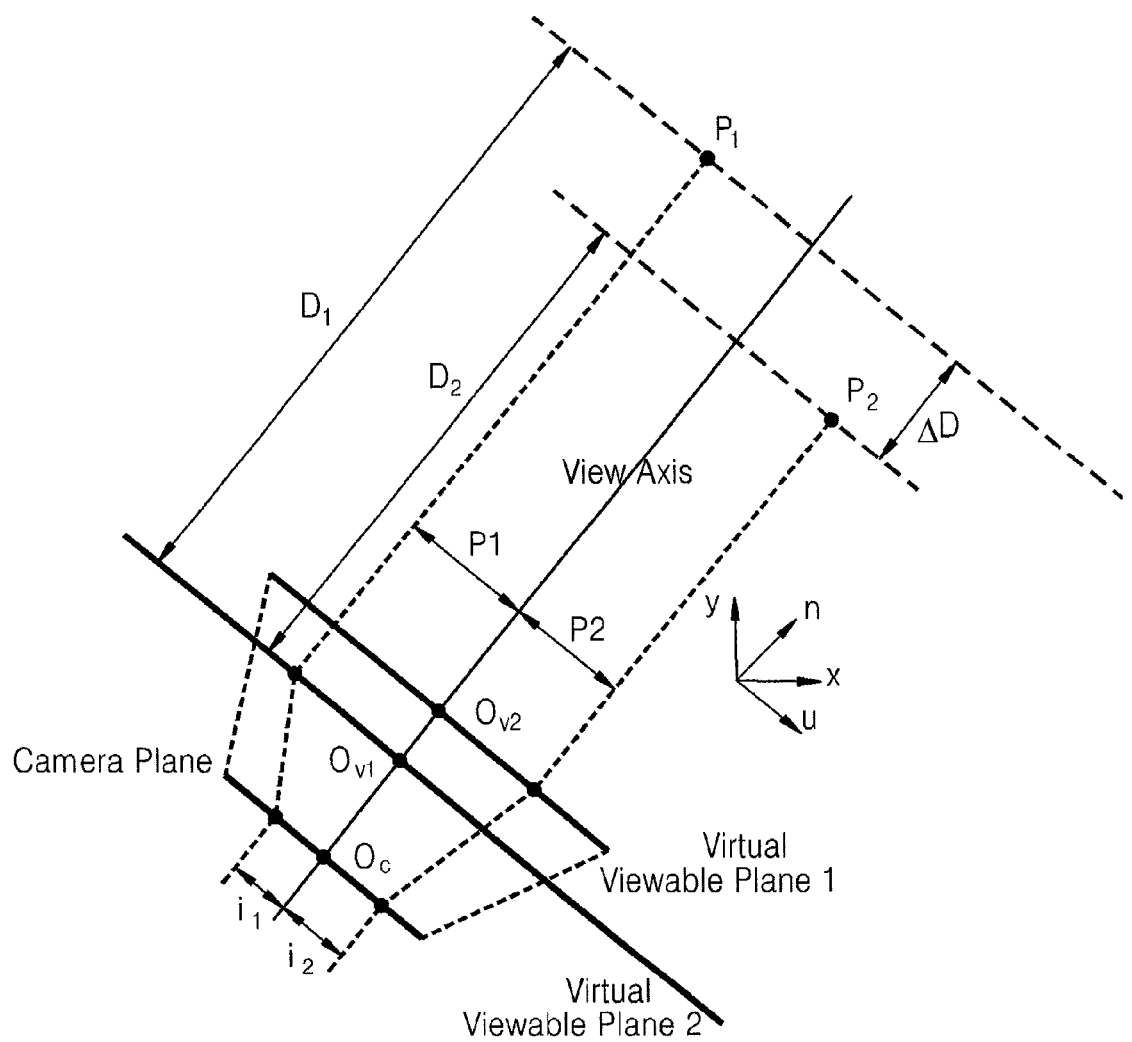
FIG. 6 is an Illustration of the self localization with two reference points.

Given parameters of visual sensor, z and Ls, we can derive the relationship between a projected reference point on the virtual viewable plane and one on the actual camera plane with their distance to the origin of their each plane. The origin of each plane is defined to be the cross point between a plane and its perpendicular line, view axis, that also crosses the location of mobile sensor. Specifically, the origin of the actual camera plane is the axis of panning. In FIG. 6, the origin on the actual camera plane is denoted as Oc and the origins of the virtual viewable planes are denoted as $O_{v1}$ and $O_{v2}$, respectively. Even though the planes are rotated as visual sensor is panned, the relationship based on the distance on each plane remains unchanged. When $p_1$ and $p_2$ denote the distance to the view axis on each virtual plane, and $i_1$ and $i_2$ denote the corresponding measurement on the actual camera plane, using (1) and (2), we can derive $$\frac{p_1}{i_1} = \frac{L_{p1}}{L_s} = \frac{D_1}{z_1 L_s} \quad (5)$$
$$\frac{p_2}{i_2} = \frac{L_{p2}}{L_s} = \frac{D_2}{z_2 L_s}$$

where $z_1$ and $z_2$ are the zoom factors of mobile sensor corresponding to distance, $D_1$ and $D_2$, from the actual camera plane to the object plane for each reference point. Ls is the size of image on which the $i_1$ and $i_2$ is measured. In practice, the location of a projected point on the image device is obtained from the image processing of the target objects such as edge detection and/or feature extraction. Thus, the projected point on the image device usually contains some uncertainty. In later sections, how this uncertainty affects self localization algorithm is discussed in detail.

2. SELF LOCALIZATION ALGORITHM

A. Self Localization with Known Orientation

In this section, we introduce self localization when two reference points with known coordinates and the orientation of visual sensor with known angle. We define θ as the angle formed between the camera plane and global x axis. We to define a unit vector ˆu to have the direction of the camera plane and ˆn be the unit vector along the view axis, the direction to which the visual sensor is facing.

Therefore, θ is the angle between the x axis and ˆu. Using the following equations, we can obtain values $p_1$, $p_2$, $D_1$ and $D_2$ in (5). In the previous section, we described $i_1$ and $i_2$ as the distance to the view axis on the camera plane, but, from now on, they are allowed to have negative values when the projected reference points are in the left side of the view axis. It does not change the distance relationship described in the previous section by allowing $p_1$ and $p_2$ to have negative value as well when they are also in the left side of the view axis.

For $p_1$ and $p_2$, $$p_1 = \overrightarrow{CP_1} \cdot \hat{u} \quad (6)$$
$$p_2 = \overrightarrow{CP_2} \cdot \hat{u}$$

For $D_1$ and $D_2$, $$D_1 = \overrightarrow{CP_1} \cdot \hat{n} \quad (7)$$
$$D_2 = \overrightarrow{CP_2} \cdot \hat{n}$$

Here, $\overrightarrow{CP_1}$ and $\overrightarrow{CP_2}$ denote the vectors from the location of mobile sensor, Oc, to each reference point. Above two sets of equations are simply the decomposition of $\overrightarrow{CP_1}$ and $\overrightarrow{CP_2}$ to the ˆu and ˆn components. Then, from (5), we have $$\frac{p_1}{i_1} = \frac{\overrightarrow{CP_1} \cdot \hat{u}}{i_1} = \frac{\overrightarrow{CP_1} \cdot \hat{n}}{zL_s} \quad (8)$$

$$\frac{p_2}{i_2} = \frac{\overrightarrow{CP_2} \cdot \hat{u}}{i_2} = \frac{\overrightarrow{CP_2} \cdot \hat{n}}{zL_s}$$

Or $$\overrightarrow{CP_1} \cdot \left(\hat{u} - \frac{i_1}{zL_s}\hat{n}\right) = 0 \quad (9)$$

$$\overrightarrow{CP_2} \cdot \left(\hat{u} - \frac{i_2}{zL_s}\hat{n}\right) = 0$$

The first terms, $\overrightarrow{CP_1}$ and $\overrightarrow{CP_2}$ of the dot product can be expressed with their x and y component in global x-y coordinate system as $$\overrightarrow{CP_1} = (P_{1x} - x_c)\hat{x} + (P_{1y} - y_c)\hat{y} \quad (10)$$

$$\overrightarrow{CP_2} = (P_{2x} - x_c)\hat{x} + (P_{2y} - y_c)\hat{y}$$

where $P_{1x}$ and $P_{2x}$ are the x components of $P_1$ and $P_2$, respectively, and $P_{1y}$ and $P_{2y}$ are the y components of $P_1$ and $P_2$, respectively. The x and y components of the second terms of the dot products are expressed by $$\left(\hat{u} - \frac{i_1}{zL_s}\hat{n}\right) \cdot \hat{x} = \cos\theta + \frac{i_1}{zL_s}\sin\theta \quad (11)$$

$$\left(\hat{u} - \frac{i_1}{zL_s}\hat{n}\right) \cdot \hat{y} = \sin\theta - \frac{i_1}{zL_s}\cos\theta$$

$$\left(\hat{u} - \frac{i_2}{zL_s}\hat{n}\right) \cdot \hat{x} = \cos\theta + \frac{i_2}{zL_s}\sin\theta$$

$$\left(\hat{u} - \frac{i_2}{zL_s}\hat{n}\right) \cdot \hat{y} = \sin\theta - \frac{i_2}{zL_s}\cos\theta$$

Then, equations (9) are equivalent to $$(P_{1x} - x_c)\left(\cos\theta + \frac{i_1}{zL_s}\sin\theta\right) + (P_{1y} - y_c)\left(\sin\theta - \frac{i_1}{zL_s}\cos\theta\right) = 0$$

$$(P_{2x} - x_c)\left(\cos\theta + \frac{i_2}{zL_s}\sin\theta\right) + (P_{2y} - y_c)\left(\sin\theta - \frac{i_2}{zL_s}\cos\theta\right) = 0$$

Let us set introduce intermediate variables to simplify the final equations for $x_c$ and $x_y$. They are $$\alpha_1 = \cos\theta + \frac{i_1 \sin\theta}{zL_s}$$

$$\beta_1 = \sin\theta - \frac{i_1 \cos\theta}{zL_s}$$

$$\alpha_2 = \cos\theta + \frac{i_2 \sin\theta}{zL_s}$$

$$\beta_2 = \sin\theta - \frac{i_2 \cos\theta}{zL_s}$$

Thus, we can obtain the coordinate of mobile sensor expressed as $$x_c = -\frac{\alpha_1 \beta_2 P_{1x} + \beta_1 \beta_2 P_{1y} - \beta_1 \alpha_2 P_{2x} - \beta_1 \beta_2 P_{2y}}{\beta_1 \alpha_2 - \alpha_1 \beta_2} \quad (12)$$

$$y_c = -\frac{-\alpha_1 \alpha_2 p_{1x} - \alpha_2 \beta_1 p_{1y} + \alpha_1 \alpha_2 p_{2x} + \alpha_1 \beta_2 p_{2y}}{\beta_1 \alpha_2 - \alpha_1 \beta_2}$$

Since the reference object is projected onto the camera plane, the coordinate of reference objects correspond to the centroid of reference objects. Then, we can obtain the coordinate of mobile sensor using (12). However, even though the coordinates of reference points are accurately known in advance, the to measurement $i_1$ and $i_2$ on the image may not be corresponding to true reference points. Possible sources of the uncertainties may arise from the pixel resolution of the actual camera planes as well as incorrect determination of the centroid of the detected reference shape. This uncertainty is evident even with perfect lens view characteristics. We will introduce the effect of non-linearity of camera lens in the later section.

B. Orientation Determination

Thus far, we have considered determining the position of mobile sensor when its orientation is given. However, it is necessary to determine the orientation of mobile sensor as well as its position. Determining both position and orientation concurrently requires a third reference point. From the parallel projection model, using (5), we can obtain the angle of the line that crosses the center the camera plane and the reference point, where the angle is formed between the line and the camera plane.

With two reference points, we have two lines with known angle respect to the camera plane and we know each reference point is on one of them. Since there are infinite many ways to position a line segment having two reference points as vertexes sitting on those lines, we cannot determine the position and the orientation of mobile sensor with two reference points.

With one more reference point, the problem becomes to position three vertexes of a triangle with known length onto three lines with known angle. There is only one way to position the triangle in such way if we limit the orientation of mobile sensor to 180° range. From above we can conclude that three reference points are enough for determining both the orientation and the location of mobile sensor when the general direction of the reference points are known, which is assumed in the following discussion.

We can find a solution by solving three simultaneous solutions using (14), but its non-linearity requires large computational complexity to be implemented on resource limited devices such as mobile robot. Instead, we developed an effective iteration algorithm which involves solving only two simultaneous equations and the solution is given in (14).

In our iteration approach, we determine the orientation of mobile sensor. Once we found the orientation, we obtain the location of mobile sensor using (14)

For a given orientation angle, $\theta$ using (14), we can obtain two sets of coordinates, $(x_{c1}, y_{c1})$ and $(x_{c2}, y_{c2})$ using two pairs of reference points out of three. When three reference points, $P_1$, $P_2$ and $P_2$ are chosen for self-localization, using $P_1$ and $P_2$, we have $$x_{c1} = -\frac{\alpha_1 \beta_2 P_{1x} + \beta_1 \beta_2 P_{1y} - \beta_1 \alpha_2 P_{2x} - \beta_1 \beta_2 P_{2y}}{\beta_1 \alpha_2 - \alpha_1 \beta_2} \quad (13)$$

-continued $$y_{c2} = -\frac{-\alpha_1\alpha_2 P_{1x} - \alpha_2\beta_1 P_{1y} + \alpha_1\alpha_2 P_{2x} + \alpha_1\beta_2 P_{2y}}{\beta_1\alpha_2 - \alpha_1\beta_2}$$

and by using another pair, $P_2$ and $P_3$, we have $$x_{c2} = -\frac{\alpha_2\beta_3 P_{2x} + \beta_2\beta_3 P_{2y} - \beta_2\alpha_3 P_{3x} - \beta_2\beta_3 P_{3y}}{\beta_2\alpha_3 - \alpha_2\beta_3} \quad (14)$$

$$y_{c3} = -\frac{-\alpha_2\alpha_3 P_{2x} - \alpha_3\beta_2 P_{2y} + \alpha_2\alpha_3 P_{3x} + \alpha_2\beta_3 P_{3y}}{\beta_2\alpha_3 - \alpha_2\beta_3}$$

In order to develop an effective iterative strategy, we investigate the behavior of the differences of the two coordinates, $d_{cx}=x_{c1}-x_{c2}$ and $d_{cy}=y_{c1}-y_{c2}$ while varying the angle of orientation. We define error distance as $$\text{error\_distance}(\theta) = \sqrt{(x_{1c} - x_{2c})^2 + (y_{1c} - y_{2c})^2} \quad (15)$$

where $\theta$ is the angle of mobile sensor's orientation.

Figure 7:
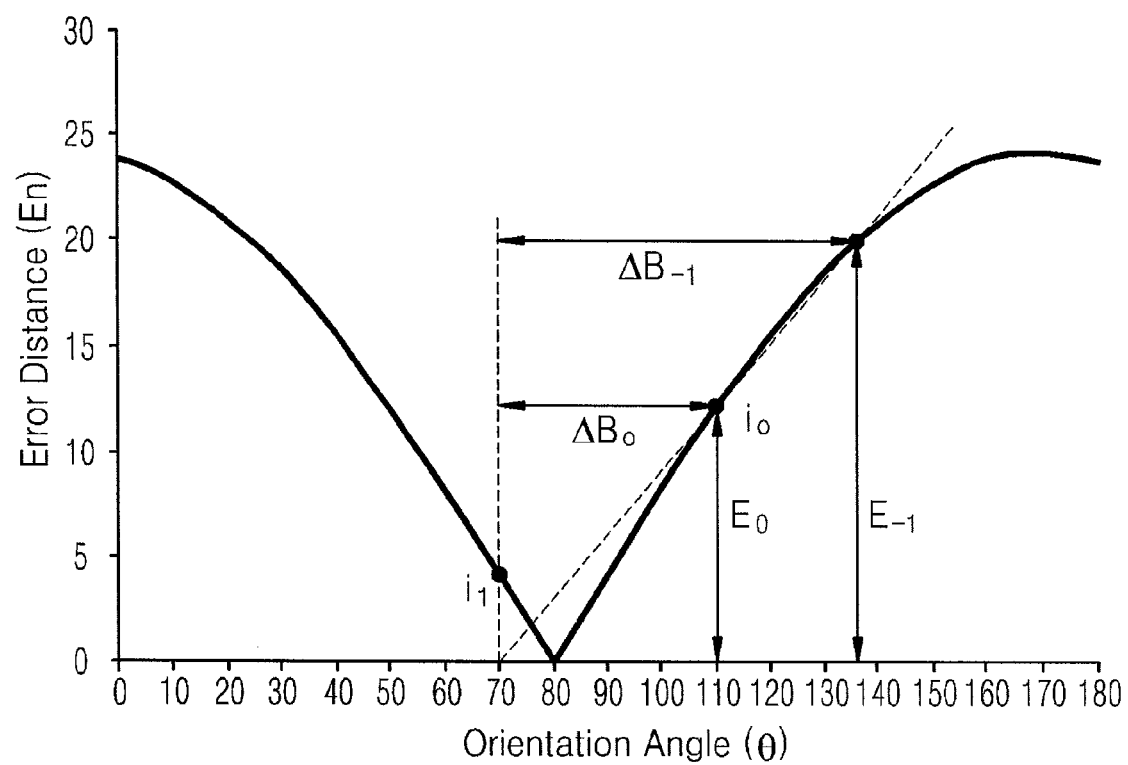
FIG. 7 is an Illustration of the distance error function as a function of orientation error.

FIG. 7 shows the behavior of this function, as $\theta$ varies from 0° to 180°. The figure shows a case when the true orientation of mobile sensor is 80°, and, at this angle, error distance($\theta$) becomes zero. We call this angle solution point. Around this point, the function is found to be symmetric and periodical with 180°.

If we start iteration inside 45° range from solution point, and if we follow down the slope, it is guaranteed to find the solution. In order to find such initial iteration point, $i_0$, inside the range, we arbitrary choose two angles separated with 90°.

Since one of them will be inside 45° range from the solution point and the other one will be outside, we simply choose the angle that gives smaller error distance($\theta$) as our initial iteration angle, $\theta_0$. Once we choose an initial point, we have the initial iteration point, $i_0$, determined by $\theta$ and error distance($\theta$). In order to estimate the slope at that point, another error distance function is evaluated using an $\theta_1$ which is chosen to be very close to $\theta_0$ such as 0°. We call this estimated slope as slope$_0$ and the relationship of the initial iteration variables are $$\Delta\theta_0 = \theta_0 - \theta_{-1} \quad (16)$$

$$\Delta E_0 = E_0 - E_{-1}$$

$$slope_0 = \frac{\Delta E_0}{\Delta\theta_0}$$

where $E_n$=error distance($\theta n$).

Depending on the sign of the estimated slope, we choose the direction of the iteration, dir. If slope$_0$>0, we set dir$_0$=−1 and, swap $\theta_0$ with $\theta_{-1}$ and, $E_0$ with $E_{-1}$. Otherwise, dir$_0$=1.

First, by assuming the slope at our initial point is close to be linear, we choose the next angle where the slope line crosses x-axis. Since the slope increases as approaching to the solution point, the next iteration step will overshoot albeit very close to the solution point. As shown in FIG. 7, the error distance function evaluated at $\theta_1$ is the other side of the solution point.

Figure 8:
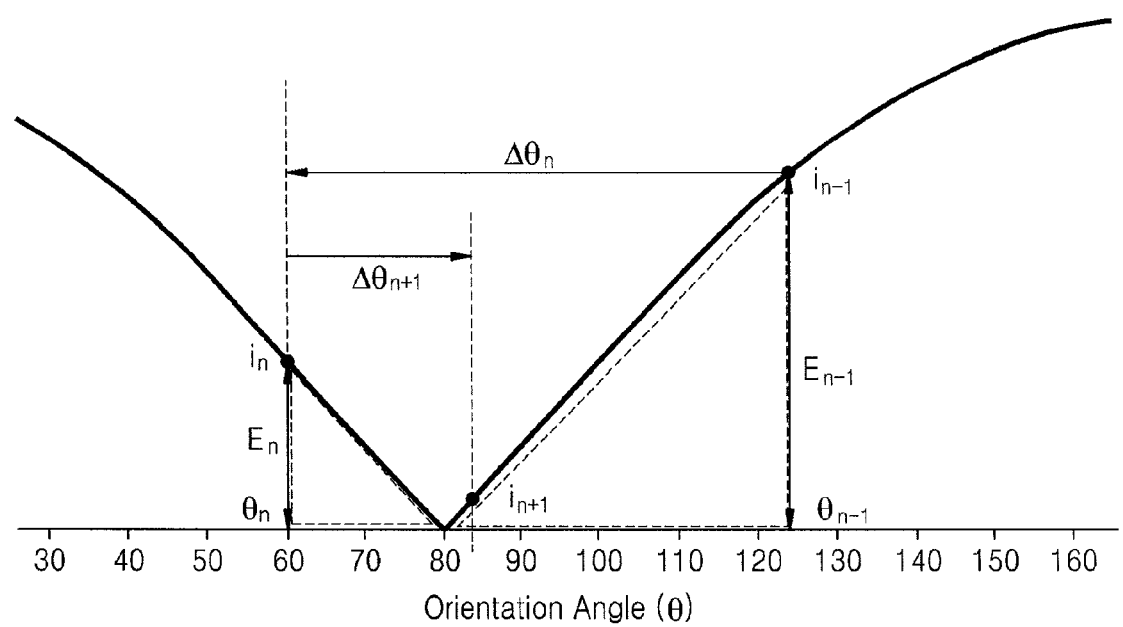
FIG. 8 is an Illustration of the convergence steps of the iteration algorithm.

From the second step, instead of using the slope, we choose the angle of next iteration step based on the two previous angle and error distance evaluated with them. In this case, since the two triangles shown in FIG. 8 are approximately proportional near to solution point, the angle for the next step is evaluated by the following equations. From $$\frac{\Delta\theta_n - \Delta\theta_{n+1}}{E_{n-1}} = \frac{\Delta\theta_{n+1}}{E_n} \quad (17)$$

the next iteration angle is calculated as $$\Delta\theta_{n+1} = dir * \frac{E_n}{E_n + E_{n-1}} * \Delta\theta n \quad (18)$$

Figure 9:
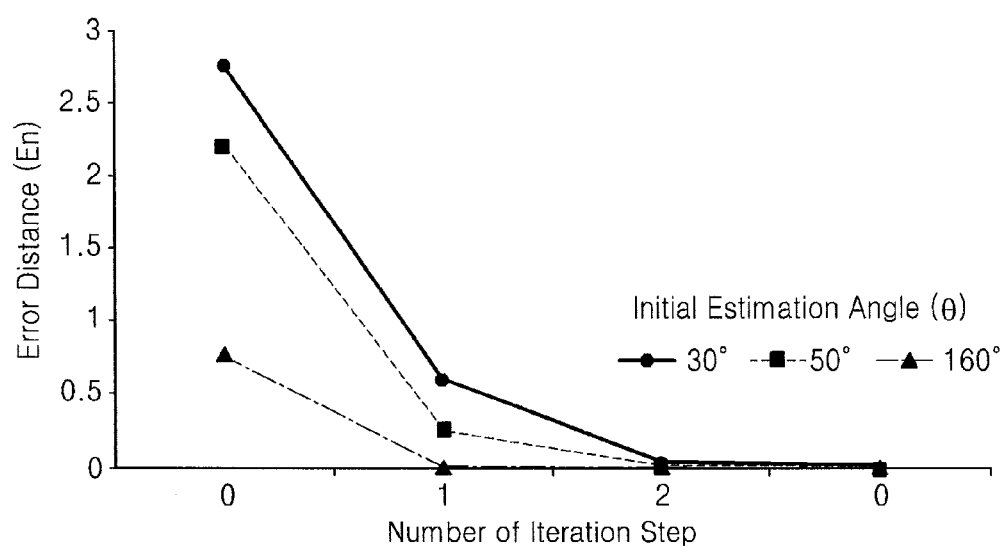
FIG. 9 is an Illustration of convergence of the iteration algorithm as a function of the number of iterations.

The iteration continues until, the change of estimated orientation, $\Delta\theta n$, becomes smaller than the threshold value, $\epsilon$. Otherwise, we change the direction, dir=dir*−1 and continue. Algorithm 1 is the pseudo code for the algorithm. FIG. 9 shows that the algorithm is converging very rapidly.

The figure shows when the iteration algorithm is applied when three initial estimation angle is used, 10°, 40° and 80°. The value of error distance($\theta$) is plotted at each iteration step. Note that the iteration starts with two initial iterations (i.e., as shown in the figure, the iteration starts at −1 index).

Algorithm 1: Orientation Estimation

Input: Initial Estimation, $\theta_0$
Input: $\Delta\theta_0$
Input: Threshold, $\epsilon$
Result: Orientation Estimation, $\theta$
$E_0$ = error_dislance ($\theta_0$);
$E_{-1}$ = error_dislance ($\theta_0$ + 90);

if $E_0 > E_{-1}$ then
 | $E_0 \leftarrow E_{-1}$
end $\theta_{-1} \leftarrow \theta - \theta_0$;
$E_0 \leftarrow$ error distance ($\theta_0$);
$E_{-1} \leftarrow$ error_dislance ($\theta_{-1}$);
$\Delta\theta_0 \leftarrow E_0 - E_{-1}$;
$slope_0 \leftarrow \frac{\Delta E_0}{\Delta\theta_0}$;

if $slope_0 > 0$ then
 | dir $\leftarrow$ −1;
 | $E_0 \leftarrow E_{-1}$;
else
 | dir $\leftarrow$ 1;
end $slope_0 \leftarrow |slope_0|$;
n $\leftarrow$ 0;
$\Delta\theta_{n+1} \leftarrow \frac{E_n}{slope_n}$;

$\theta_{n+1} \leftarrow \theta_n + $ dir $* \Delta\theta_{n+1}$;
n $\leftarrow$ n + 1
$E_n \leftarrow$ error distance ($\theta_n$);

-continued

Figure 10:
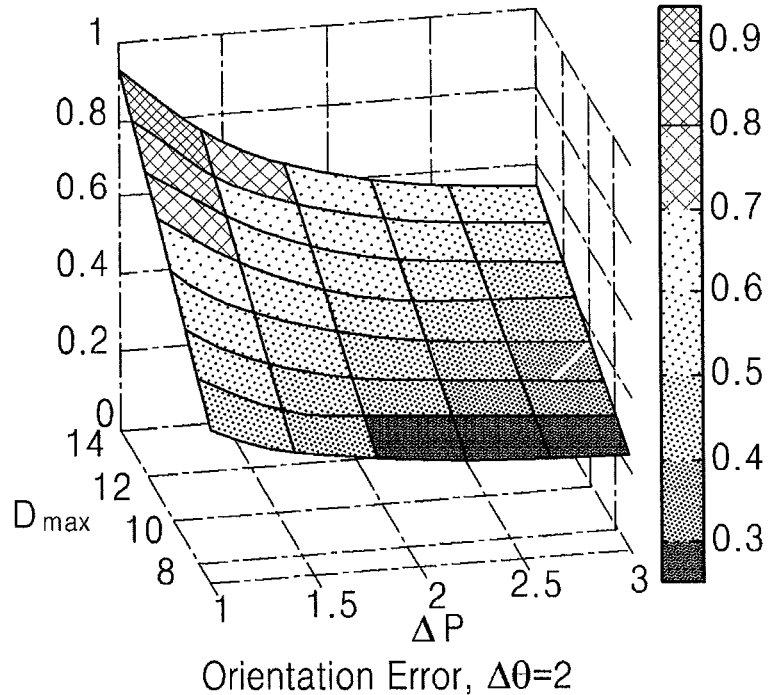
FIG. 10 and FIG. 11 are Illustration of the displacement error as a function of the orientation error.
Figure 11:
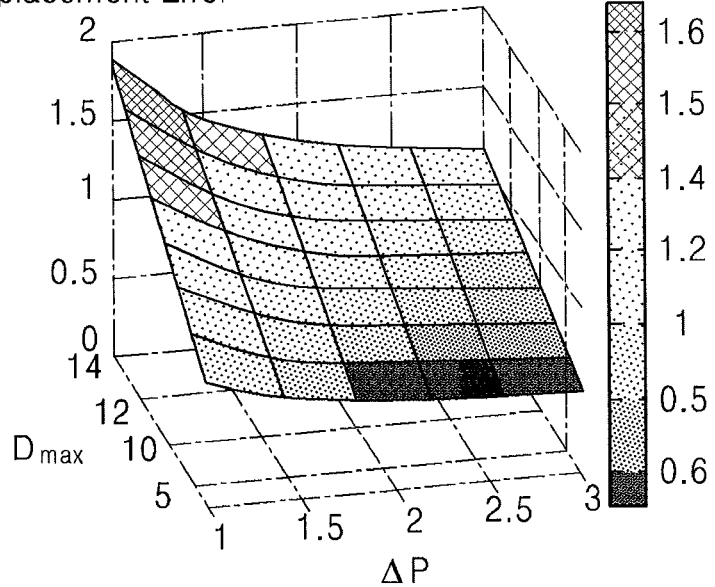

Algorithm 1: Orientation Estimation while $\Delta\theta_n > \varepsilon$ do
$\quad$ theta$_n$ + 1 ← $\frac{E_n}{E_n + E_{n-1}}$ * $\Delta\theta_n$;
$\quad$ E$_{n+1}$ ← error distance $(\theta_{n+1})$;
$\quad$ n ← n + 1
end θ ← theta$_n$;

FIG. 10 and FIG. 11 illustrates the importance of the orientation error on the localization. The plots show the displacement error for several orientation errors. Throughout this paper, the displacement error is defined as $$\sqrt{(x_{c,true} - x_{c,est})^2 + (y_{c,true} - x_{y,est})^2} \quad (19)$$

where $(x_{c,true}, y_{c,true})$ is the true coordinate and $(x_{c,est}, y_{c,est})$, is the estimated coordinate. The results are plotted as a function of ΔP and $D_{max}$ where ΔP represents the separation (in parallel to the projected plane) between the reference points and the $D_{max}$ represents the largest distance (perpendicular to the projected plane) of the reference points. The angle determination is very critical since the displacement is computed after the orientation is determined. Thus, if the orientation computation is not accurate, the localization may not successfully estimate the coordinates.

C. Lens Distortion

Figure 12:
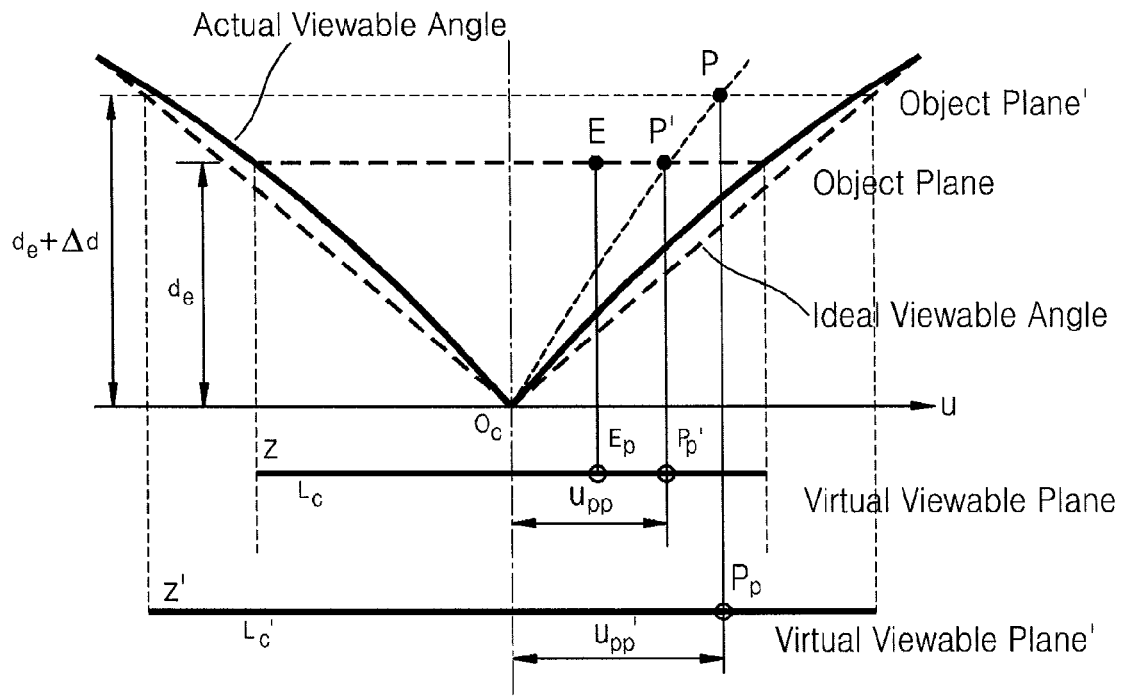
FIG. 12 is an Actual Zooming Model caused by Lens Distortion

FIG. 12 illustrates the actual (non-ideal) zooming model caused by lens distortion where the dashed line and the solid line indicate ideal viewable angle and actual viewable angle, respectively with zoom factors $$z_1 = \frac{D_1}{L_{c,1}}$$

and $$z_2 = \frac{D_2}{L_{c,2}}.$$

Figure 13:
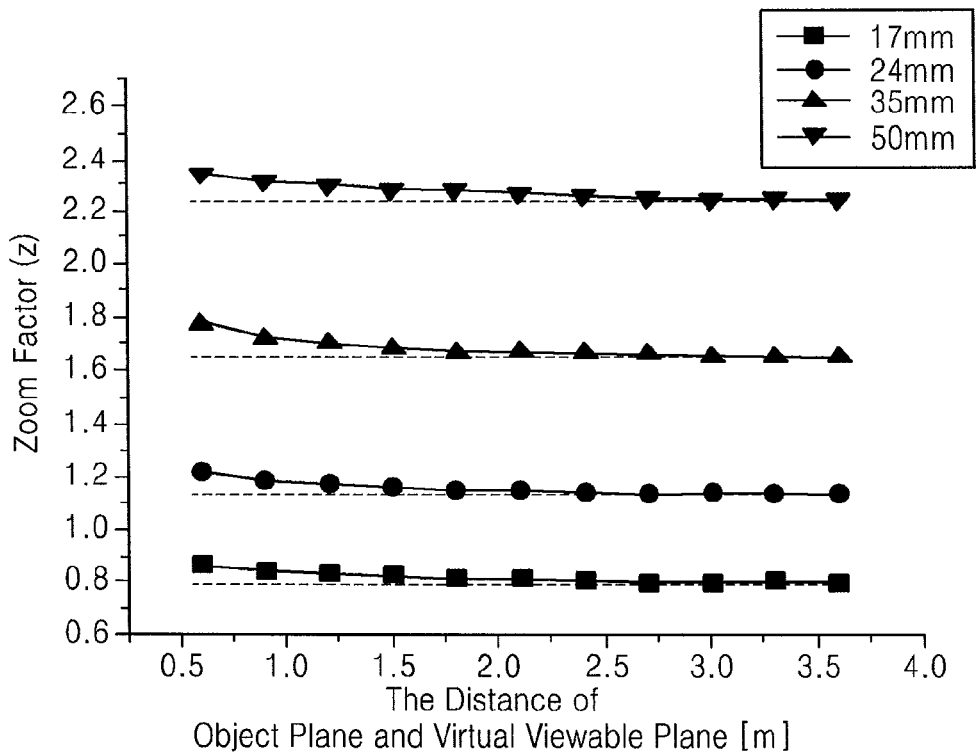
FIG. 13 is a Zooming Distortion on a Function of Distance from the camera and various Actual Zoom Factors are used.

Hence, $z_1 = z_2$ when the lens view is ideal and linear. But most practical lens view has non-linear zoom factor. FIG. 13 illustrates zooming non-linearity which is a function of distance from the lens. The figure shows zooming factor obtained with a typical commercial lens (i.e., Tamron SP AF 17-50 mm Zoom Lens) where the dashed line is the ideal zoom factor (i.e., when infinite distance model is assumed) and the solid line is the actual measured (non-ideal) zoom factor.

TABLE 1

| | c | | | | | | | | |
|---|---|---|---|---|---|---|---|---|---|
| d | 0.3 | 0.6 | 0.9 | 1.2 | 1.5 | 1.8 | 2.1 | 2.4 | 2.7 |
| 0.9 | 0.919045 | — | — | — | — | — | — | — | — |
| 1.2 | 0.907152 | 0.895669 | — | — | — | — | — | — | — |
| 1.5 | 0.913304 | 0.906332 | — | — | — | — | — | — | — |
| 1.8 | 0.906496 | 0.901083 | 0.899770 | — | — | — | — | — | — |
| 2.1 | 0.907152 | 0.901411 | 0.899880 | — | — | — | — | — | — |
| 2.4 | 0.902887 | 0.898294 | 0.895451 | 0.893045 | — | — | — | — | — |
| 2.7 | 0.902805 | 0.899483 | 0.899114 | 0.897084 | — | — | — | — | — |
| 3.0 | 0.906332 | 0.903051 | 0.902778 | 0.900591 | 0.899934 | — | — | — | — |
| 3.3 | 0.906742 | 0.903584 | 0.903735 | 0.902457 | 0.901329 | — | — | — | — |
| 3.6 | 0.902559 | 0.901083 | 0.900591 | 0.897884 | 0.894882 | 0.894685 | — | — | — |
| 3.9 | 0.906332 | 0.901534 | 0.901712 | 0.899668 | 0.896522 | 0.896380 | 0.896583 | — | — |
| 4.2 | 0.904856 | 0.899114 | 0.898731 | 0.896531 | 0.892913 | 0.891076 | 0.889272 | — | — |
| 4.5 | 0.914124 | 0.911663 | 0.911253 | 0.909510 | 0.906496 | 0.905717 | 0.904633 | 0.904589 | — |
| 4.8 | 0.914698 | 0.913386 | 0.913386 | 0.912730 | 0.910236 | 0.909886 | 0.908511 | 0.908629 | — |
| 5.1 | 0.911909 | 0.911212 | 0.911445 | 0.909469 | 0.906890 | 0.905170 | 0.903743 | 0.902672 | 0.901839 |

TABLE I illustrates calibrated zoom factors. Note that the zoom factors depends on the distance from the imaging device as well as the distance from the axis of the lens. The non-linear distortion of non-ideal lens affects scale in the parallel projection model. Since the distances between the mobile sensor and the references are not known, we compute the coordinate of the mobile sensor using the value of z corresponds to the value when the distance is large (i.e., the value of z converges to a specific value). Once initial value of the coordinate is obtained, we use specific values of z (i.e. the one for the first reference and the other for the second reference) to compensate the non-linearity to obtain the final coordinate of the mobile sensor.

Algorithm 2 describes this procedure.

Algorithm 2: The pseudo code for compensation procedure

1. Estimate $(x_c, y_c)$ and θ of mobile sensor using the z corresponds to infinite distance
2. Compute $(D_1, D_2)$
3. Use$(z_1, z_2)$ using the distance from the zoom factor table
4. Recalculate $(x_C, y_c)$ and θ

Figure 14:
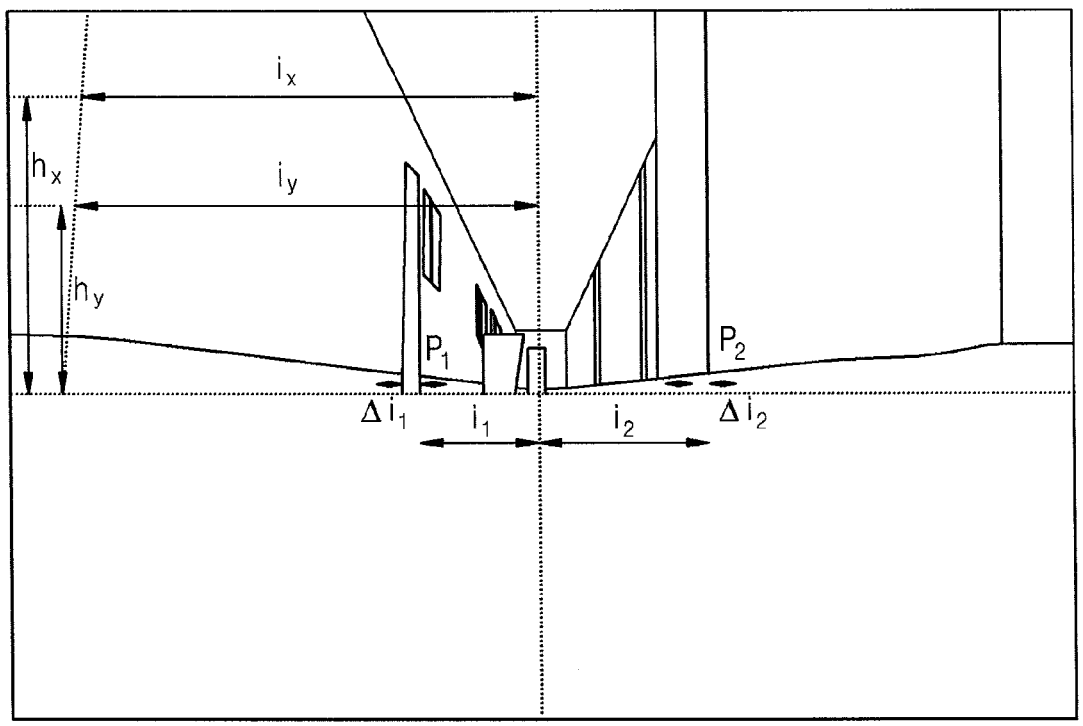
FIG. 14 is the image used to illustration of nonlinear effect of the lens on estimation error.

FIG. 14 illustrates the nonlinear effect on the coordinate determination. In the figure, the orientation is chosen to be 0 (i.e., view axis is perpendicular to the x axis). The camera is located at (4.8 m, 3.0 m) with respect to the global coordinate (0, 0) and the first reference $P_1$ is located at (4.5 m, 4.5 m) and the second reference $P_2$ is located at (5.1 m, 5.1 m). These coordinates are used to illustrate the severe non-linearity near the camera as shown in FIG. 12.

The lens is set at 17 mm zoom range. The value of Ls is 18.4 cm (i.e., the image size in x direction). The projected position of the first reference $i_1$ is at 3.85 cm and the projected position of the second reference $i_2$ is at 2.45 cm from the center of the image.

These position is from the center of the reference objects to the center of the image. The reference objects both have finite widths of 0.16 cm and 0.12 cm corresponding to $\Delta i_1 = 0:0087$ and $\Delta i_1 = 0:0065$, respectively. In this paper, $\Delta i$ is is defined as the uncertainty range or the measurement error with the respect to the overall image size (i.e., 18.4 cm in the example). Since the centroid of the reference points are determined from the image, potential measurement errors will be in within $\Delta i$.

The actual zoom factor corresponding to the first reference $z_1$ is 0.8238 and the zoom factor corresponding to the second reference $z_2$ is 0.8119. In the initial estimation, the zoom factor corresponding to the infinite distance of 0.8 is used. The estimated coordinate without compensation is (4.8017 m, 3.03815 m) which is 3.87 cm off from the true position of mobile sensor. For this experiment zoom factor, at a specific zoom setting, for the camera is measured and tabulated in Table I Where row entry corresponds to the distance from mobile sensor to reference point and column entry to the horizontal distance from viewable axis to the reference point.

D. Effects of Reference Measurement Uncertainty

As briefly discussed in the previous section, the measurement error cannot be avoided. And the measurement error directly affects toe accuracy of the localization including the orientation.

Since the reference object is usually projected as an area on the image, in order to apply the parallel projection model, one point should be determined from the area. In the parallel projection model, we only take the horizontal component of the determined point. If we designate the coordinate of reference object as its centroid, we can choose its position on the camera plane, i, as the center of the projected area.

However, if the shape of reference object is not symmetric round, there is always certain amount of error in determining i. This type of error is usually influenced by the image processing in finding the boundary of the projected references. Quantization error due to limited resolution of the visual sensor may affect the accuracy but it is not the biggest source of error.

Another source of measurement error is when the reference object is not projected in the center horizontal line (i.e., illustrated as dotted line in FIG. 14). This is because the lens distorts the projected objects. In the figure, the edge of a wall has one coordinate values.

However, multiple reference values can be obtained for the edge of a wall. For example, both $i_x$ measured at $h_x$ and $i_y$ measured at $h_y$ should represent the same coordinate, but the projected values are different. The difference between $i_x$ and $i_y$ contributes as $\Delta i$ in the localization. Hence, it is always better to extract reference objects close to the center horizontal line on the image. The orientation errors due to the incorrect determination of $i_1$ and $i_2$ are illustrated in FIG. 15 and FIG. 16.

Figure 15:
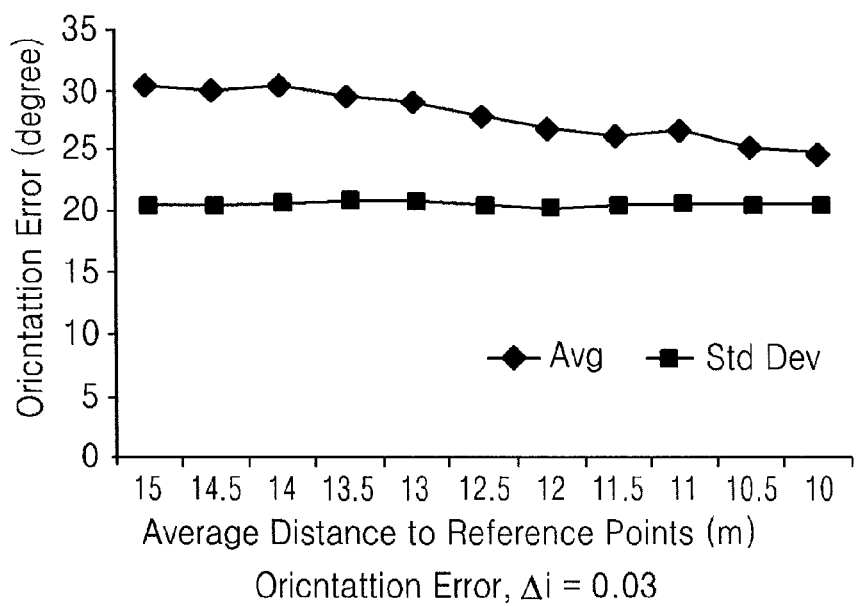
FIG. 15 and FIG. 16 are Illustration of the orientation error, ¢µ, as a function of the projected measurement.
Figure 16:
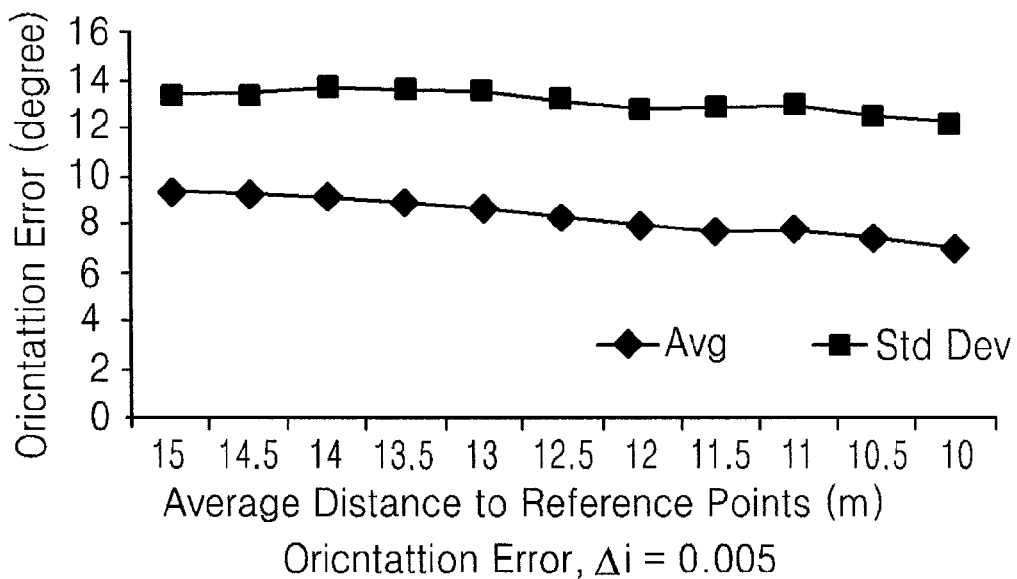

FIGS. 15 and 16 shows the results for two different values of the measurement errors. The average of orientation error is measured using all the possible combinations of reference points located on 5 m by 5 m grid. Each is reference point is located at 50 cm interval in the grid with small amount of additional random variation.

Due to the deviation of $i_1$ and $i_2$, the estimated orientation can different from the true orientation of mobile sensor. The figures show that overall range of error and standard deviation is larger when $\Delta i = 0.03$ than when $\Delta i = 0.05$.

Also, when the mobile sensor is closer to the reference points. The orientation error is very critical since the actual coordinates are obtained by first computing the orientation.

Figure 17:
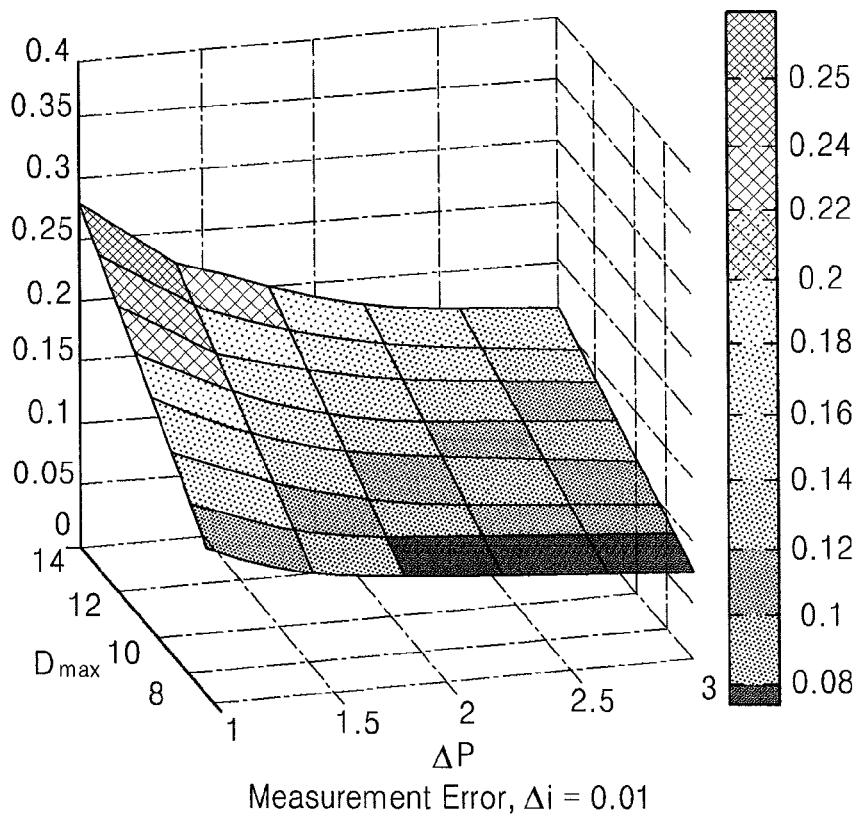
FIG. 17 and FIG. 18 are Illustration of displacement error as a function of projected measurement error.
Figure 18:
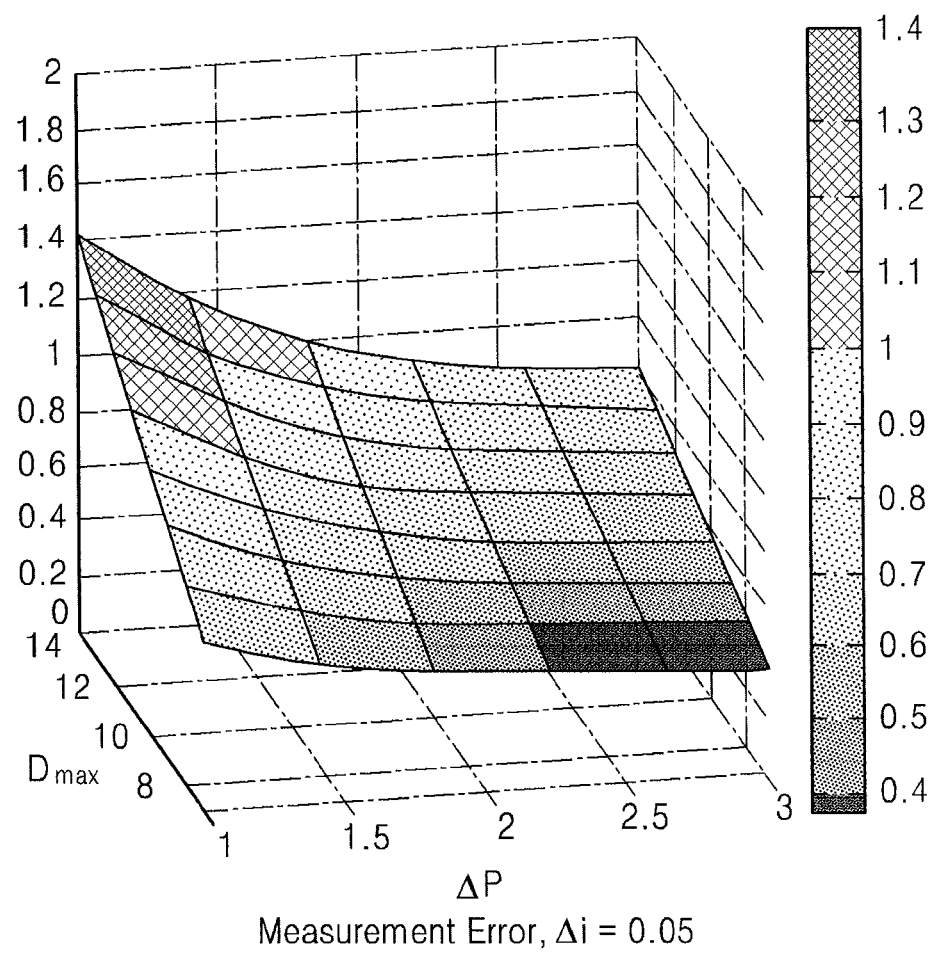

The similar results are obtained for the displacement errors in FIGS. 17 and 18. Similarly, FIGS. 17 and 18 shows the results for two different values of the measurement errors. The displacement error is plotted as a function of two variables, $D_{max}$, the largest distance from the mobile sensor to the reference points, and $\Delta P$, and the distance between two most separated reference points measured from the view axis of the mobile sensor.

As the figure shows, the overall error range increases as $\Delta i$ increases. Both result show that the algorithm is more prone to error when distance from mobile sensor to reference points is larger and when the references are closer to one another. From FIGS. 15, 16, 17 and 18, we know that estimation error is smaller when the distance between the reference objects along the camera plane is larger. Since our iteration algorithm use two pairs of reference objects out of three pairs that can be made from three reference objects, given three reference points, $R_1, R_2, R_3$, we can choose two pairs that give maximum distance on the camera plane to minimize error.

This selection criterion can be applied also when there are more than three reference objects are viewable and need to select three of them for self localization.

3. ANALYSIS AND SIMULATION

A. Experiment Setup

Figure 19:
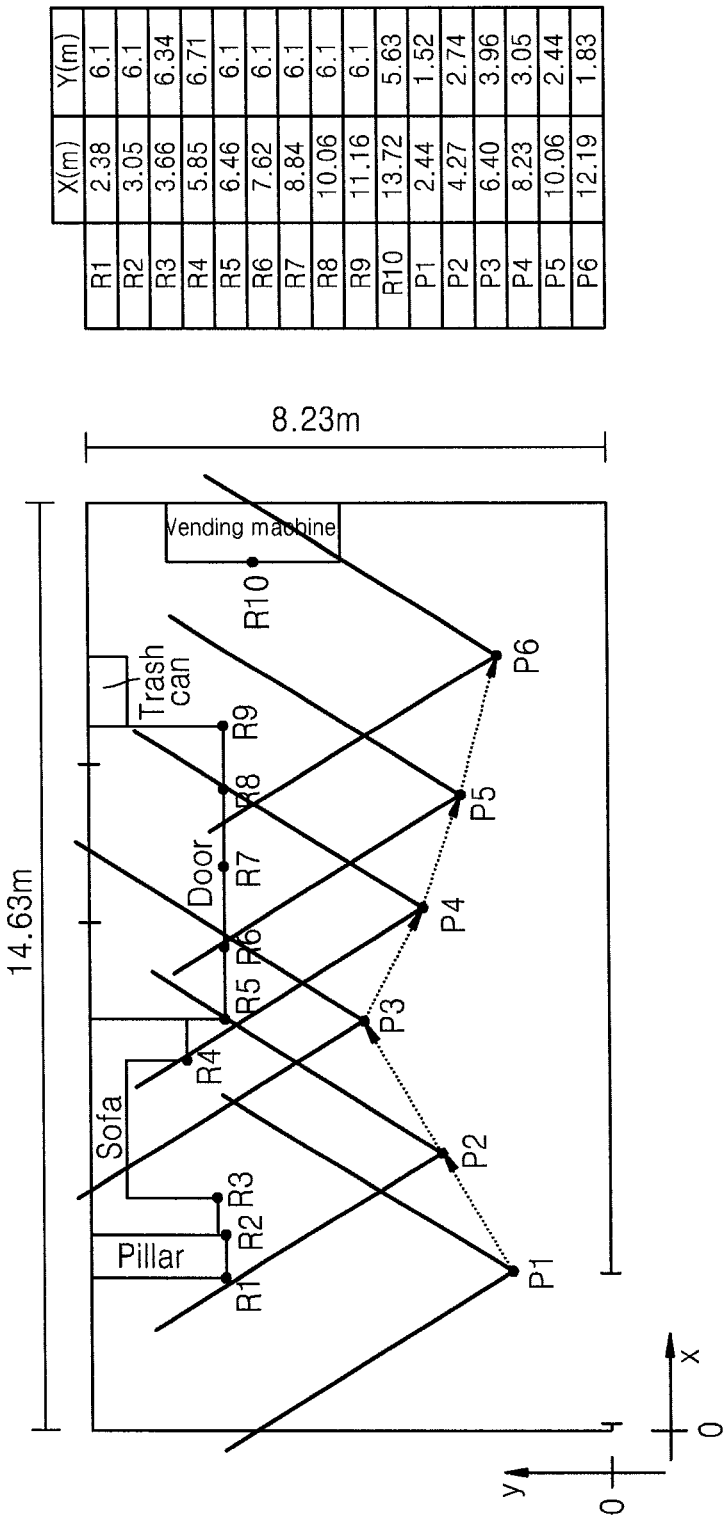
FIG. 19 is an Experimental setup used in the self localization illustration. (10 reference points are used by the mobile sensor located at 6 distinct coordinates. The actual coordinates are shown in the table.)

FIG. 19 shows the experimental setup for the verification of the proposed method. A mobile sensor is placed at several positions indicated by $P_1, P_2 \ldots, P_6$ with $P_1$, as the starting position. The orientation of the visual sensor is facing up at 90°. Several reference points, $R_1, R_2, \ldots, R_{10}$, are designated and measured beforehand. At each position, the mobile sensor executes the proposed algorithm 3 before moving on to the next position. In the table on right side of the figure, the coordinates of the position of mobile sensor and those of reference objects are listed.

| Algorithm 3; The pseudo code for the algorithm |
|---|
| Initial Position and angle |
| for k 0 to  K – 1 do |
|     if three reference objects are in viewable range then |
|         Pan camera until at least three reference objects |
|         in viewable range |
|     end |
|     Estimate Orientation |
|     Calculate the Sensor Position |
|     Zoom Factor Error Compensation |
|     Move to next position |
| end |

We evaluate two cases. The first case assumes the orientation is known and the displacement errors are obtained. In the second case, the orientation is computed first and the displacement errors are obtained from the orientation.

B. Localization Performance with Known Orientation

We first assume that mobile visual sensor knows its orientation. In the experiment, the orientation is fixed at 90°. Hence the localization performance depends solely on the choice of the reference points and measurement errors.

Figure 20:
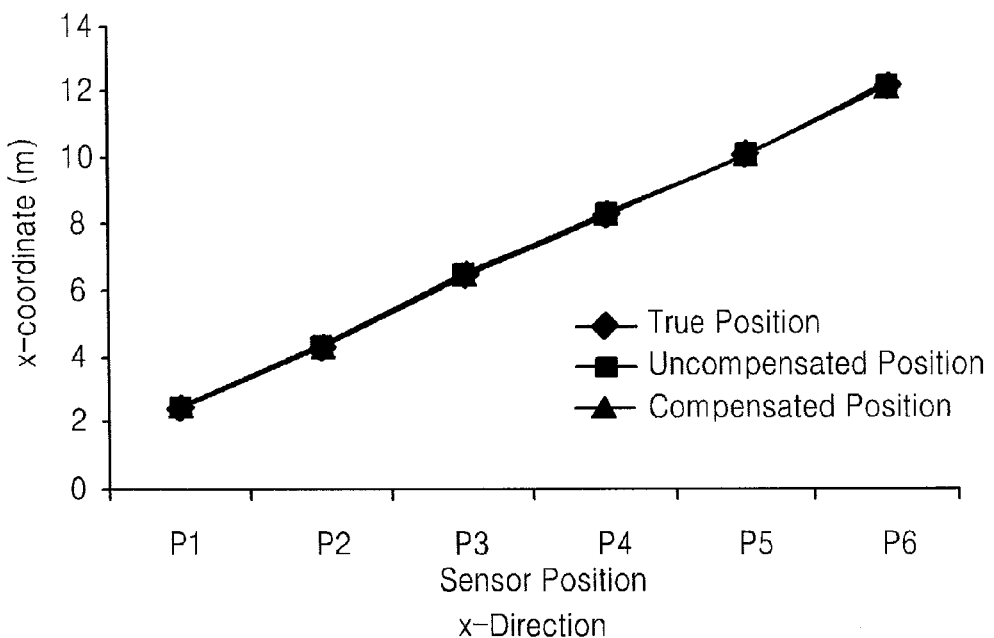
FIG. 20 and FIG. 21 are Illustration of displacement error at each mobile sensor location with known orientation. (Both compensated and uncompensated coordinates are compared to that of true coordinates.)
Figure 21:
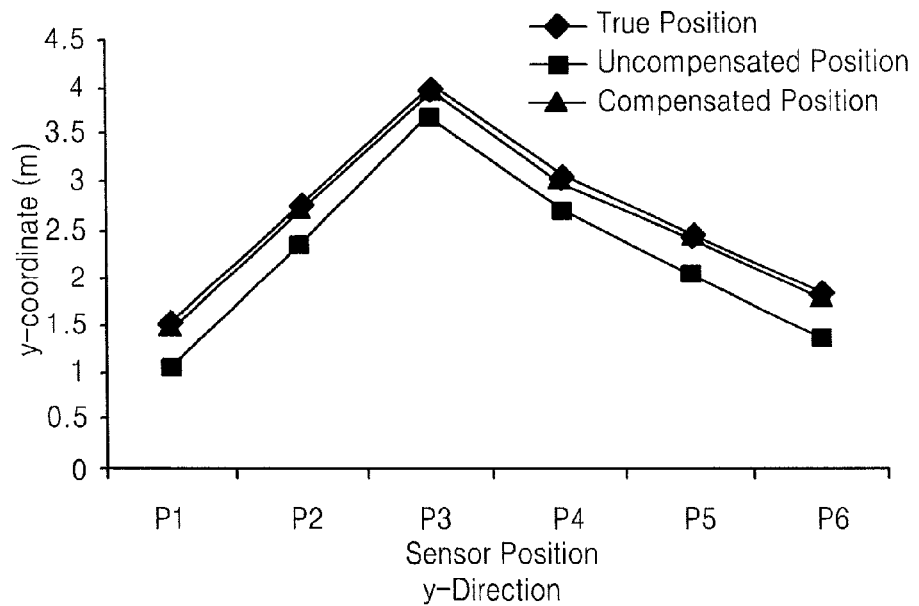

FIG. 20 and FIG. 21 show the true position of mobile sensor, in x-direction and y-direction separately, and their estimated trajectory obtained from using the algorithm. The deviation from the true position is the distance error from the true position to the estimated position of mobile sensor.

Two estimated positions are plotted that show the effect of zoom factor compensation. For the uncompensated estimation, the average value of the zoom factors illustrated in TABLE I. While displacement error in x-direction as shown in FIG. 20 is negligible, the displacement error in y-direction as shown in FIG. 21 illustrates that the uncompensated estimation deviates from the true position as much as 0.5 m.

It indicates the zooming factor is very sensitive to the distance from the visual sensor to the reference points. It is because zoom factor has non-linear property only along the y-direction or the distance from mobile sensor to reference objects. However, when the zoom factors are compensated within the algorithm, the distance error in y-direction disappeared. The effect of reference points pairing is also investigated with the inclusion of the measurement errors, $\Delta i$. In order to illustrate the effect, we compare the results from the maximal separation pairing to that of the minimal separation pairing.

The value of $\Delta i$ is added to or subtracted from the projected reference points i's to make the separation between the two reference points smaller, which maximizes the localization error. The values of $\Delta i$ are chosen to be 0.005, 0.01, 0.03. These values are the potential measurement errors caused by having to choose a point from the range of projected objects.

Figure 22:
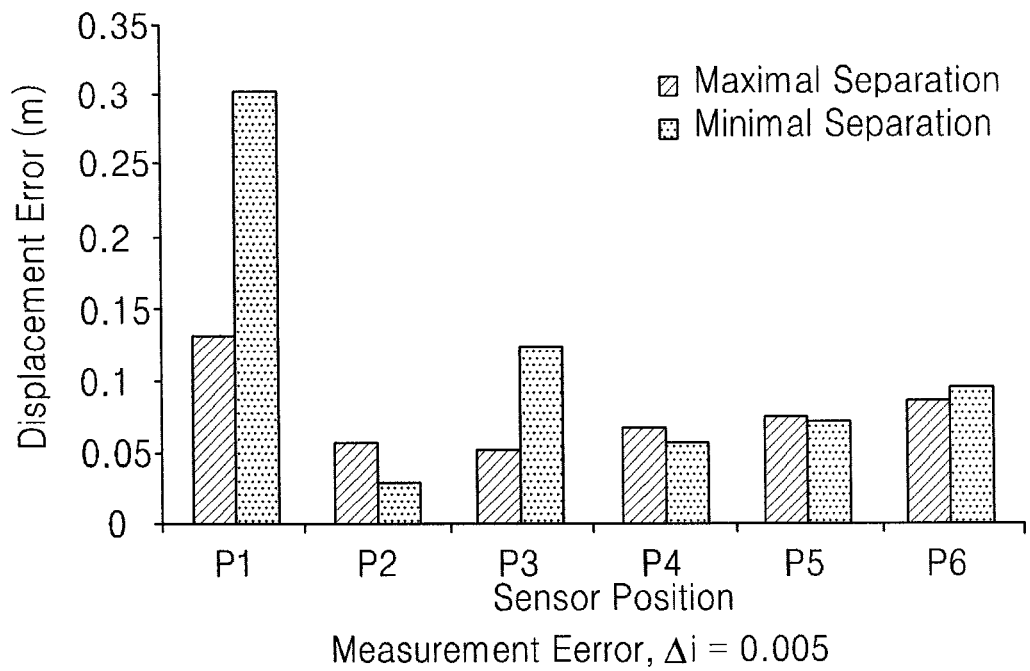
FIG. 22, FIG. 23 and FIG. 24 are Illustration of displacement error for different measurement errors. (Each figure illustrates the displacement error corresponding to the maximal and minimal separation methods.)
Figure 23:
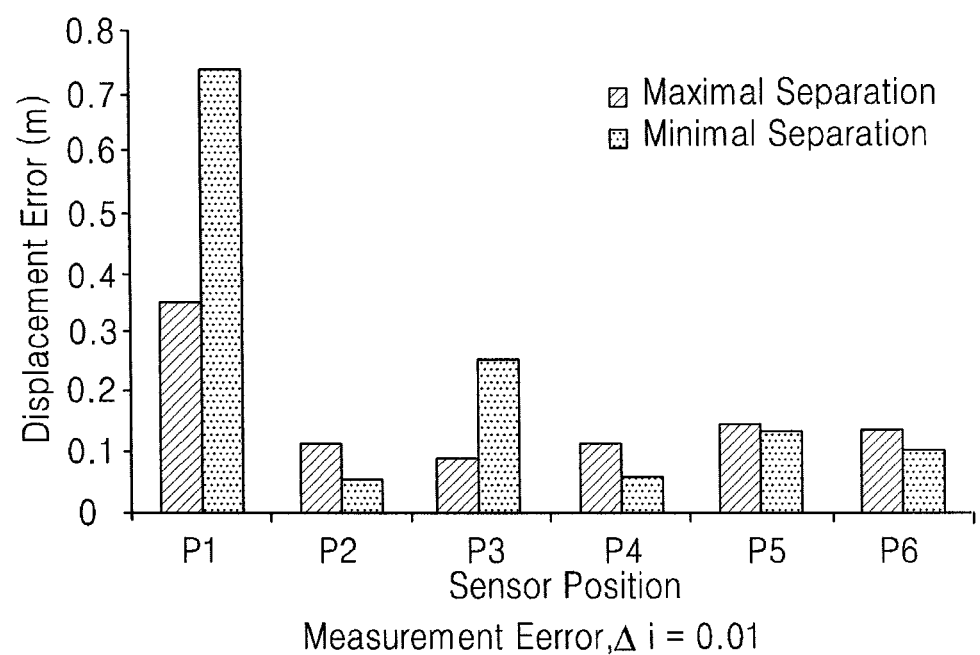
Figure 24:
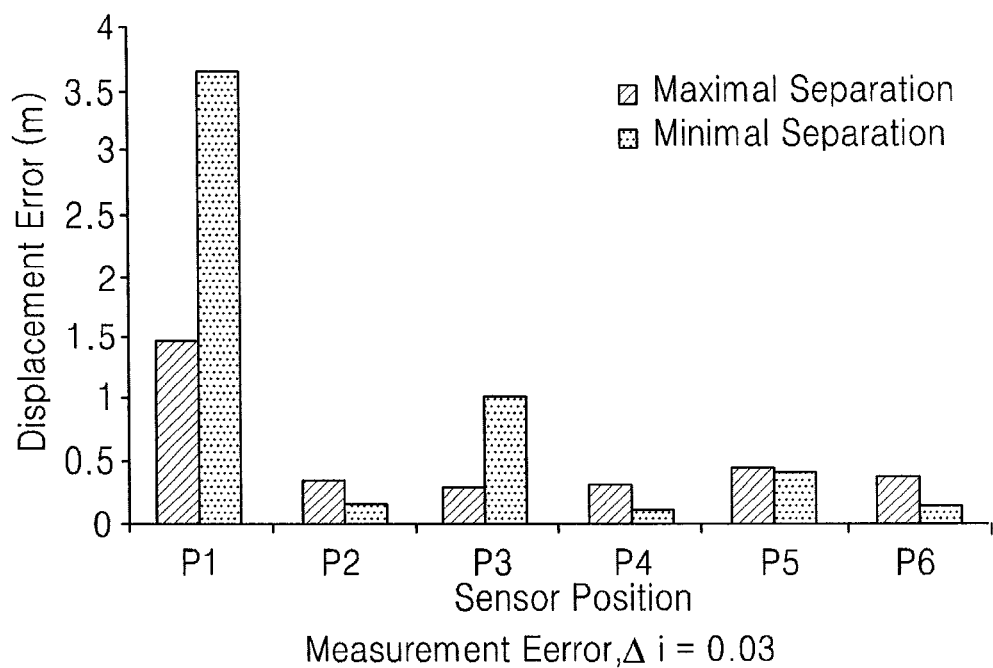
Figure 25:
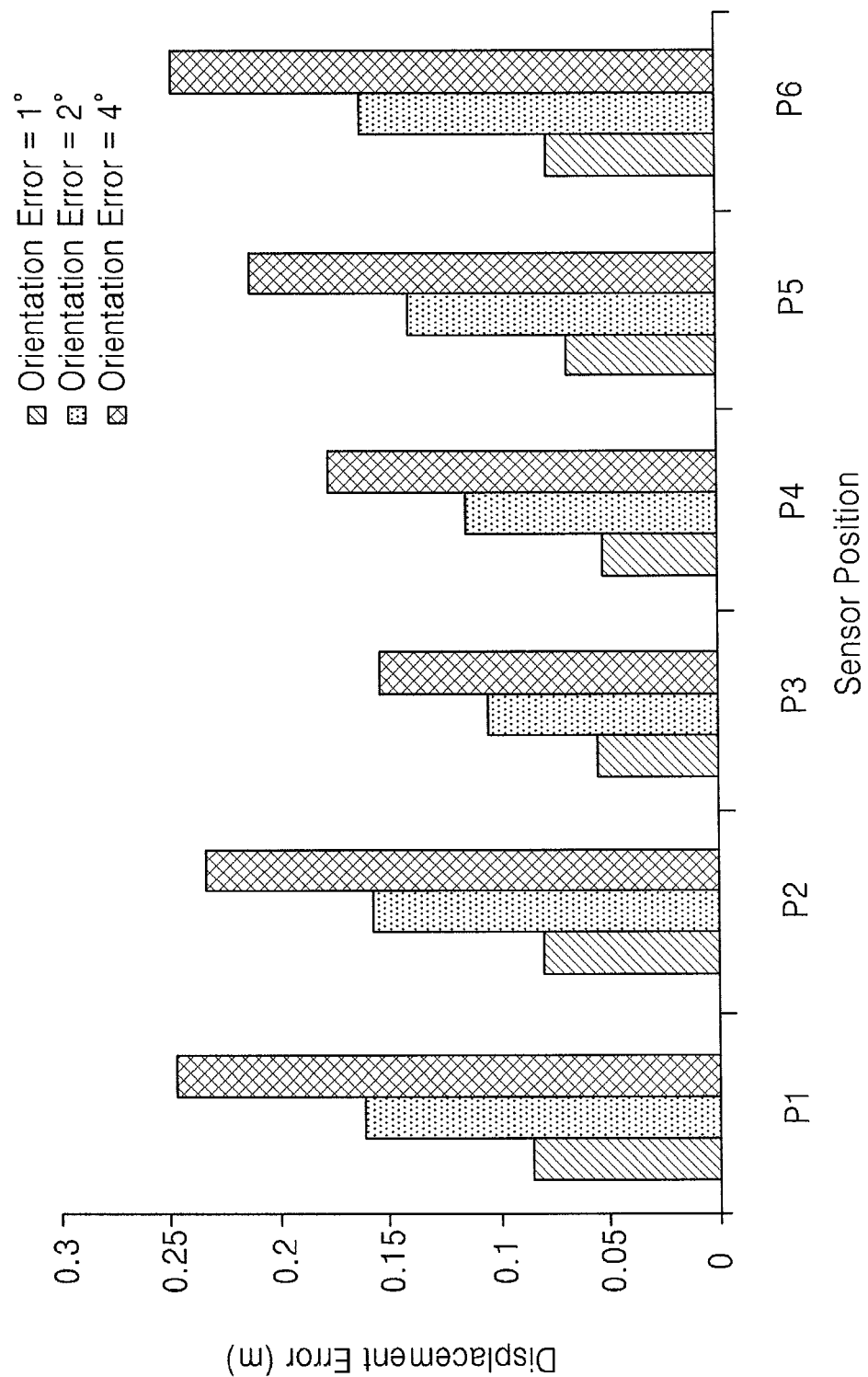
FIG. 25 is an Illustration of displacement error for different orientation errors.

FIGS. 22, 23 and 24 illustrates the simulation results for three different measurement errors. As illustrated in the figures, the average displacement error with the maximal separation pairing is lowers than that with the minimal separation pairing. Note that the estimated coordinate for $P_1$ is larger than the other coordinate since reference points are close to one another and ability to differentiate the reference points are smaller. Also the results correspond to the findings shown in FIGS. 17 and 18 where the localization error gets larger when the distance between the reference points, $\Delta P$, become smaller. Similar to the previous investigation, the effect of orientation errors is shown in FIG. 25.

The figure illustrates how the displacement error is affected by the orientation error. Note that the simulation results still assume the orientation is known. The orientation error is simply included in the algorithm. Without the measurement error, the orientation error does not affect the displacement error. In the next section, we investigate the inclusion of the measurement errors on the orientation determination.

C. Localization Performance with Unknown Orientation

Figure 26:
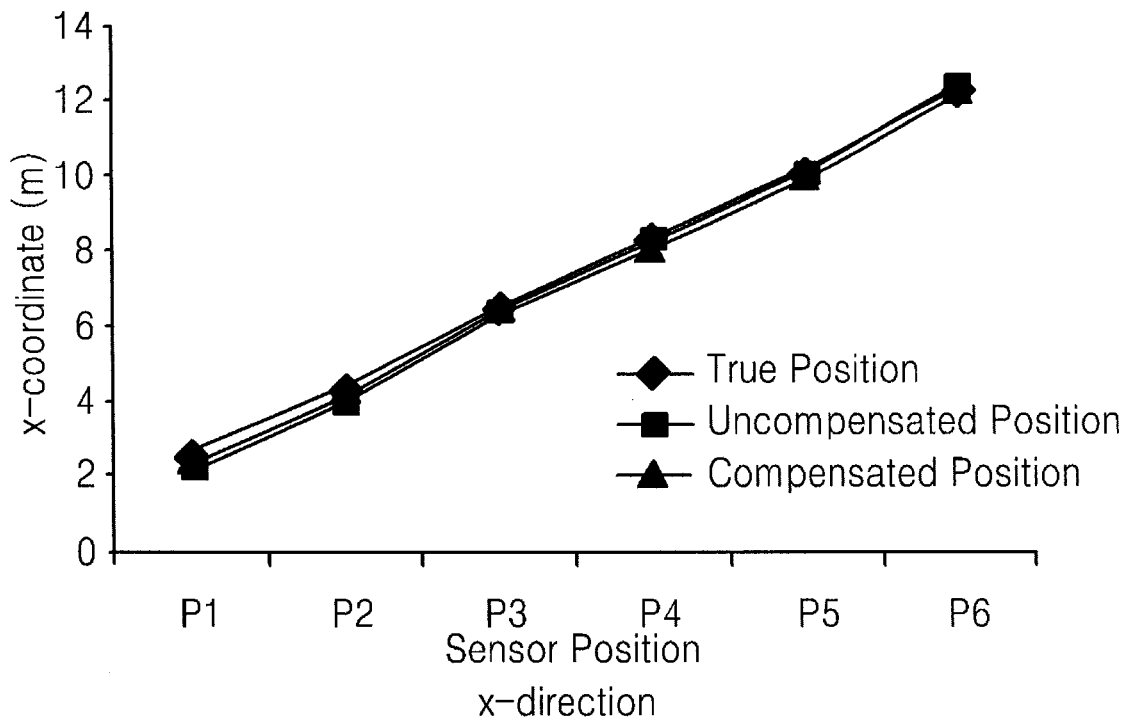
FIG. 26 and FIG. 27 are Illustration of displacement error at each mobile sensor location with unknown orientation. (Both compensated and uncompensated coordinates are compared to that of true coordinates.)
Figure 27:
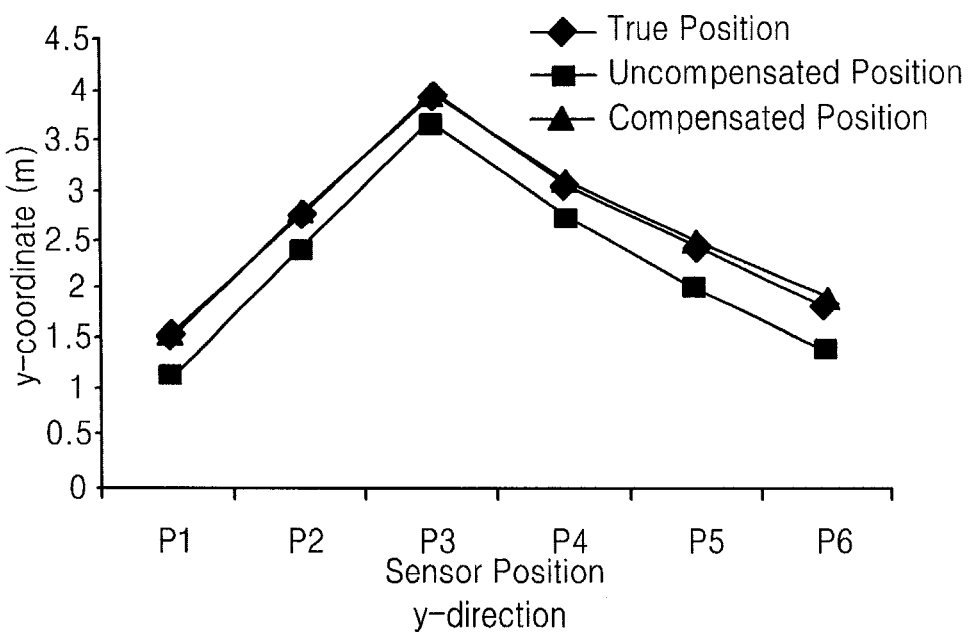

In practice, the mobile sensor estimate the orientation as well as the coordinates. The proposed localization algorithm can determine the orientation of the sensor from the reference points. Since the coordinate of mobile sensor is determined from the estimated orientation, the minimization of the error in estimating the orientation is very critical. FIG. 26 and FIG. 27 illustrate the displacement error in x-direction and y-direction, respectively. As before, the displacement error in x-direction is negligible even without the compensation. Similar result is also shown in y-direction. The difference between these two figures from the previous figures obtained for the known orientation is that the displacement error is computed after the orientation is determined.

Figure 28:
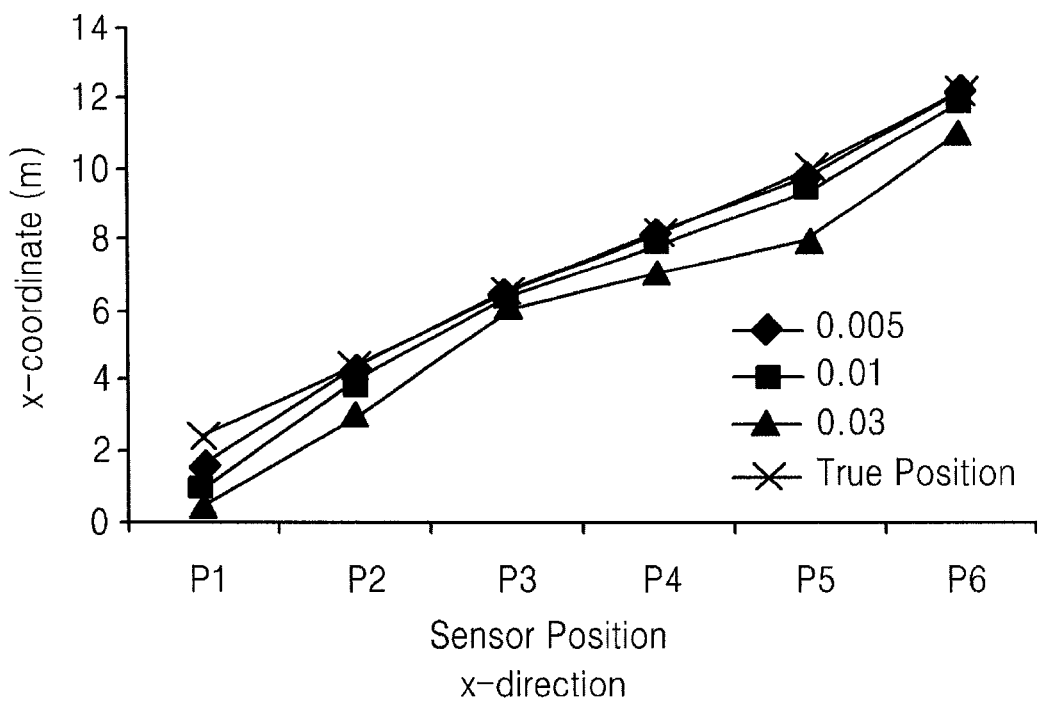
FIG. 28 and FIG. 29 are Illustration of displacement error for different measurement errors for unknown orientation. (The displacement error is obtained after the orientation estimation with the measurement errors.)
Figure 29:
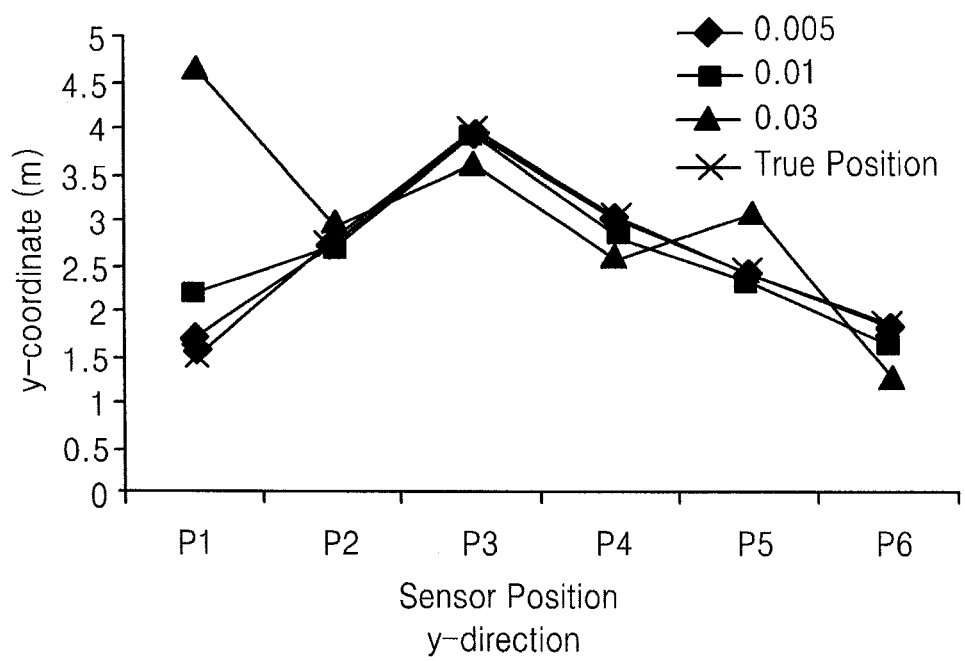

FIGS. 28 and 29 shows the effect of $\Delta i$ on the error of coordination of mobile sensor. For this simulation, we used maximal separation criterion for reference objects selection. As shown in the figure when mobile sensor is farther to the reference objects, the coordinate error is more sensitive to $\Delta i$. In our experiment setup, the mobile sensor is closest to its selected reference points at the position $P_3$. In the figure, at $P_3$, the coordinate error is least sensitive to $\Delta i$. When the mobile sensor at $P_1$, where its distance to the reference objects are farthest, the coordinate error is very sensitive to $\Delta i$.

Especially, the y-direction error at $P_1$, in FIG. 29 shows the large sensitivity to $\Delta i$ of the coordinate error in y-direction. It is because the captured image does not contain any depth information, the variation to i can be mapped to large range of location of mobile sensor in y-direction. The 0.03 as $\Delta i$ value, is unrealistic considering the real dimension of the image.

Figure 30:
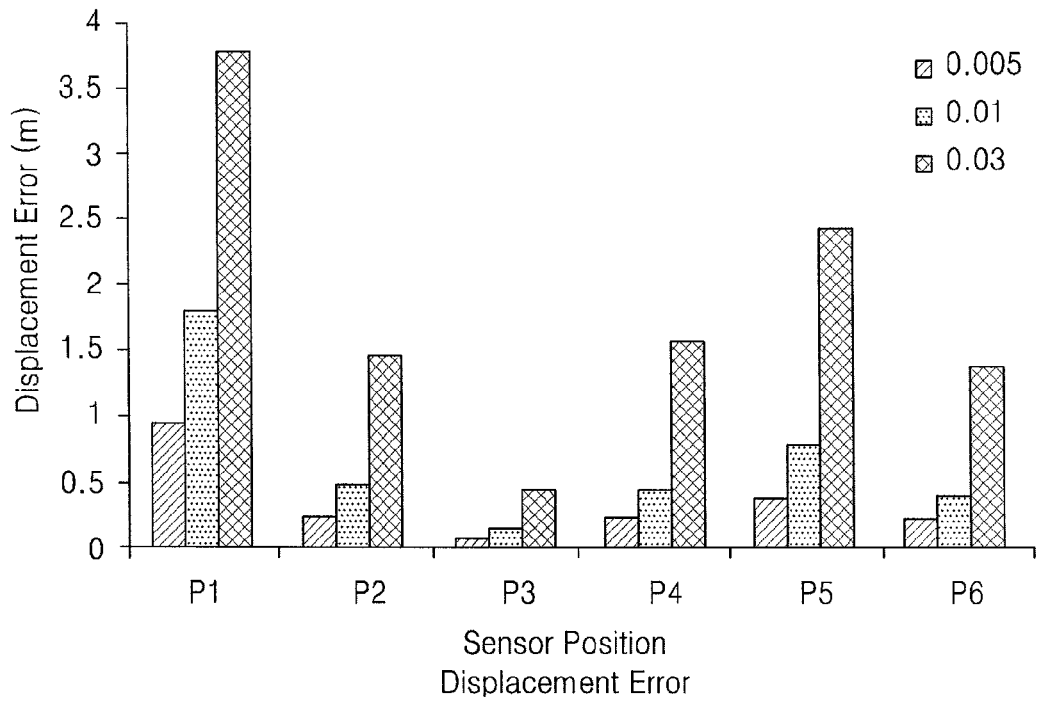
FIG. 30 and FIG. 31 are summary of the displacement error and corresponding orientation error as a function of measurement errors.
Figure 31:
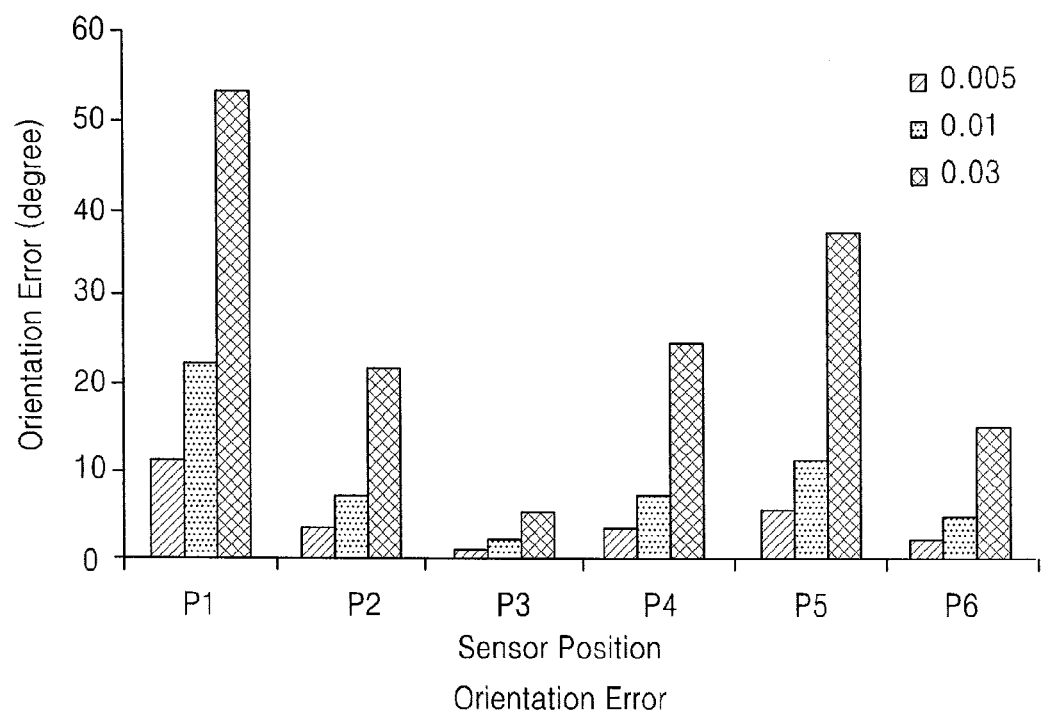

Finally, FIGS. 30 and 31 shows the orientation error cause by $\Delta i$. Three $\Delta i$ values are used in the illustration. Here, the distance error is calculated from the true position of mobile sensor to the estimated position. As shown in the figure, the uncertainty of the projected reference point, $\Delta i$, affects the coordinate and the orientation error at the same time with the same degree. As it is shown, the error is more sensitive to $\Delta i$, when the mobile sensor is farther from the reference objects.

5. CONCLUSION

In this paper, we present a novel self localization method using parallel projection model for mobile sensor in navigation applications. The algorithm estimates the coordinate and the orientation of mobile sensor using projected references on single visual image. Non-linearity and distortion of typical lens are compensated using lens specific calibration table. The method utilizes a simple iterative algorithm, which is very accurate with low computational demand. We identify various sources of measurement error that affects the estimation accuracy. We demonstrate with an example that the algorithm can be utilized in robot navigation as well as positioning application where accurate self localization is necessary.

The above described embodiments of the present invention are programmable and can be recorded in a computer-readable storage media in the form of a program read by universal digital computers. Also, the data structures of the instance play method of the above described embodiments of the present can be recorded in the computer readable storage media using various means.

The computer readable storage media includes a magnetic storage media (e.g. Read Only Memory (ROM), floppy disc, hard disc), optical digital disk (e.g. Compact Disk (CD) and Digital Video Disk (DVD)), and carrier wave (e.g. transmission on Internet).

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

INDUSTRIAL APPLICABILITY

The self localization method of the present invention is applicable to a field of manufacturing navigation and a field of ubiquitous environment.

The invention claimed is:

1. A method of recognizing a self location of an image acquisition device by acquiring an image of two or more reference objects, the method comprising:
setting an actual camera plane, two or more reference object planes, and two or more virtual viewable planes located between the actual camera plane and the reference object planes;
projecting the reference objects to a corresponding one of the virtual viewable planes;
calculating a distance between a viewing axis and the reference objects and a distance between the viewing axis and images on the actual camera plane, the images corresponding to the reference objects; and
sensing the self location of the image acquisition device by using an orientation and a zoom factor of the image acquisition device and coordinates of the reference objects,
wherein the zoom factor is a ratio of a length of the reference object planes and a distance between the reference object planes and the virtual viewable planes, and
the actual camera plane, the virtual viewable planes, and the reference object planes are perpendicular to the viewing axis.

2. The method of claim 1, further comprising compensating the self location by using a compensation table, wherein the compensating comprises:
estimating the self location and the orientation by using a zoom factor corresponding to an infinite distance;
calculating a distance between the reference object planes and the virtual viewable planes corresponding thereto, according to the estimated location and orientation; and
recalculating the location and the orientation by using the zoom factors using the distance, selected from the compensation table.

3. A method of recognizing a self location of an image acquisition device by acquiring an image of three or more reference objects, the method comprising:
setting an actual camera plane, three or more reference object planes, and three or more virtual viewable planes located between the actual camera plane and the reference object planes;
projecting the reference objects to a corresponding one of the virtual viewable planes;
calculating a distance between a viewing axis of the image acquisition device and the reference objects and a distance between the viewing axis and images on the actual camera plane, the images corresponding to the reference objects;
calculating an orientation of the image acquisition device by selecting an initial orientation by using two pairs of reference points to minimize an error distance and repeatedly computing the orientation of the image acquisition device by using the initial orientation and the error distance; and
sensing the self location by using the orientation, a zoom factor, and coordinates of the reference objects,
wherein the zoom factor is a ratio of a length of the reference object planes and a distance between the reference object planes and the virtual viewable planes, and
the actual camera plane, the virtual viewable planes, and the reference object planes are perpendicular to the viewing axis.

4. The method of claim 3, wherein the calculating an orientation of the image acquisition device comprises:
selecting an orientation allowing the error distance to be minimized, as the initial orientation by using the two pairs of the reference points;
selecting a smaller one between an error distance corresponding to the initial orientation and an error distance corresponding to an orientation greater than the initial orientation by 90 degrees, as an initial error distance;
calculating an approximate orientation by deducting a minute orientation from the initial orientation, calculating an approximate error distance corresponding to the approximate orientation, and calculating a slope at a location corresponding to the initial orientation by using a ratio of a difference between the initial error distance and the approximate error distance corresponding to the approximate orientation and the minute orientation;
setting a direction of iteration to be negative and setting the approximate error distance to be a present error distance when the slope is positive and setting the direction of iteration to be positive when the slope is not positive;
setting an absolute value of the slope as an initial slope, setting a ratio of the present error distance and a present slope as a next minute orientation, setting a value obtained by adding a value obtained by multiplying the direction of iteration by the minute orientation to a present orientation as a next orientation, and setting an error distance corresponding to the present orientation as a new present error distance;
reiterating the setting operations until the minute orientation becomes a predetermined threshold and repeatedly computing a value obtained by multiplying a ratio of the present error distance and a value obtained by adding to the present error distance to a previous error distance by a present minute orientation as the next orientation; and
determining the previous orientation repeatedly computed to be the orientation of the image acquisition when the minute orientation is the predetermined threshold or less.

5. The method of claim 3, further comprising compensating the location by using a compensation table, wherein the compensating comprises:
estimating the location and the orientation by using a zoom factor corresponding to an infinite distance;
calculating a distance between the reference object planes and the virtual viewable planes corresponding thereto, according to the estimated location and orientation; and
recalculating the location and orientation by using the zoom factors using the distance, the zoom factors selected from the compensating table.

* * * * *